United States Patent
Norkin et al.

(10) Patent No.: US 9,955,188 B2
(45) Date of Patent: Apr. 24, 2018

(54) DEBLOCKING FILTERING CONTROL

(71) Applicant: Telefonaktiebolaget LM Ericsson (publ), Stockholm (SE)

(72) Inventors: Andrey Norkin, Solna (SE); Kenneth Andersson, Gävle (SE); Rickard Sjöberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/476,656

(22) Filed: Mar. 31, 2017

(65) Prior Publication Data

US 2017/0272781 A1    Sep. 21, 2017

Related U.S. Application Data

(63) Continuation of application No. 14/001,627, filed as application No. PCT/SE2011/051526 on Dec. 16, 2011, now Pat. No. 9,641,841.

(Continued)

(51) Int. Cl.
   *H04N 19/117* (2014.01)
   *H04N 19/86* (2014.01)
   (Continued)

(52) U.S. Cl.
   CPC ......... *H04N 19/86* (2014.11); *H04N 19/117* (2014.11); *H04N 19/14* (2014.11); *H04N 19/176* (2014.11); *H04N 19/82* (2014.11)

(58) Field of Classification Search
   None
   See application file for complete search history.

(56) References Cited

U.S. PATENT DOCUMENTS

2004/0101059 A1* 5/2004 Joch ............... H04N 19/159
                                                           375/240.29
2005/0013363 A1* 1/2005 Cho ............... H04N 19/105
                                                           375/240.12

(Continued)

FOREIGN PATENT DOCUMENTS

EP    2681913 B1    11/2015
JP    2005123732 A    5/2005

(Continued)

OTHER PUBLICATIONS

An, Jicheng et al., "CE 8 subtest1: Improved deblocking filter", IEEE, Joint Collaborative Team on Video Coding (JCT-VC) of ITU-T SG16 WP3 and ISO/IEC JTC1/SC29/WG11, 4th Meeting: Daegu, Korea, Jan. 2011, 1-8.

(Continued)

*Primary Examiner* — William C Vaughn, Jr.
*Assistant Examiner* — Michael J Hess
(74) *Attorney, Agent, or Firm* — Murphy, Bilak & Homiller, PLLC

(57) ABSTRACT

A first filter decision value is calculated for a block of pixels in a video frame based on pixel values of pixels in a first line of pixels in the block. A second filter decision value is also calculated for the block based on pixel values of pixels in a corresponding first line of pixels in a neighboring block in the video frame. The first filter decision value is used to determine how many pixels in a line of pixels in the block to filter relative to a block boundary between the block and the neighboring block. The second filter decision value is used to determine how many pixels in a corresponding line of pixels in the neighboring block to filter relative to the block boundary.

13 Claims, 11 Drawing Sheets

Related U.S. Application Data

(60) Provisional application No. 61/447,862, filed on Mar. 1, 2011.

(51) Int. Cl.
*H04N 19/82* (2014.01)
*H04N 19/176* (2014.01)
*H04N 19/14* (2014.01)

(56) References Cited

U.S. PATENT DOCUMENTS

| | | | |
|---|---|---|---|
| 2005/0276505 A1* | 12/2005 | Raveendran | H04N 19/176 382/268 |
| 2006/0078048 A1* | 4/2006 | Bjontegaard | H04N 19/139 375/240.03 |
| 2009/0285308 A1* | 11/2009 | Panchapakesan | H04N 19/61 375/240.24 |
| 2010/0142844 A1 | 6/2010 | Pereira et al. | |

FOREIGN PATENT DOCUMENTS

| | | |
|---|---|---|
| JP | 2010141883 A | 6/2010 |
| WO | 2012044074 A2 | 4/2012 |

OTHER PUBLICATIONS

An, Jicheng, "TE10 Subtest1: Improved Deblocking Filter", Joint Collaborative Team on Video Coding, of ITU-T SG16 WP3 and ISO/IEC JTC1/SC29/WG11, 3rd Meeting, Guangzhou, CN, Oct. 7-15, 2010, 1-8.

Ikeda, Masaru et al., "Parallel Deblocking Filter", Joint Collaborative Team on Video Coding (JCT-VC) of ITU-T SG 16 WP3 and ISO/IEC JTCJ/SC29/WG Document to JCT-VC, 11 4th Meeting, Jan. 2011, pp. 1-7.

List, Peter et al., "Adaptive Deblocking Filter", IEEE Transactions on Circuits and Systems for Video Technology, vol. 13, Issue 7, Jul. 2003, 614-619.

Narroschke, Matthias, "Reduction of Operations in the Critical Path of the Deblocking Filter", Joint Collaborative Team on Video Coding (JCT-VC) of ITU-T SG 16 WP3 and ISO/IEC JTC1/SC29/WG, Document to JCT-VC, 11 4th Meeting, Jan. 20-28, 2011. pp. 1-15.

Norkin, Andrey et al., "Development of HEVC Deblocking Filter", Joint Collaborative Team on Video Coding (JCT-VC) of ITU-T SG16 WP3 and ISO/IEC JTC1/SC29/WG, Document to JCT-VC, 11 4th Meeting: Daegu, KR, Jan. 20-28, 2011. pp. 1-4.

Norkin, Andrey et al., "Ericsson Deblocking Filter", Joint Collaborative Team on Video Coding (JCT-VC) of ITU-T SG 16 WP3 and ISO/I EC JTC1/SC29/WG, Document to JCT-VC, 11 5th Meeting: Geneva,Mar. 16-23, 2011. pp. 1-17.

Ugur, Kemal et al., "Appendix to Description of video coding technology proposal by Tandberg Nokia Ericsson", Joint Collaborative Team on Video Coding (JCT-VC) of ITU-T SG16 WP3 and ISO/IEC JTC1/SC29/WG11, Dresden, DE, Apr. 15-23, 2010, 1-55.

Ugur, Kemal et al., "High Performance, Low Complexity Video Coding and the Emerging HEVC Standard", IEEE Transactions on Circuits and Systems for Video Technology, vol. 20, No. 12, Dec. 2010, 1688-1697.

\* cited by examiner

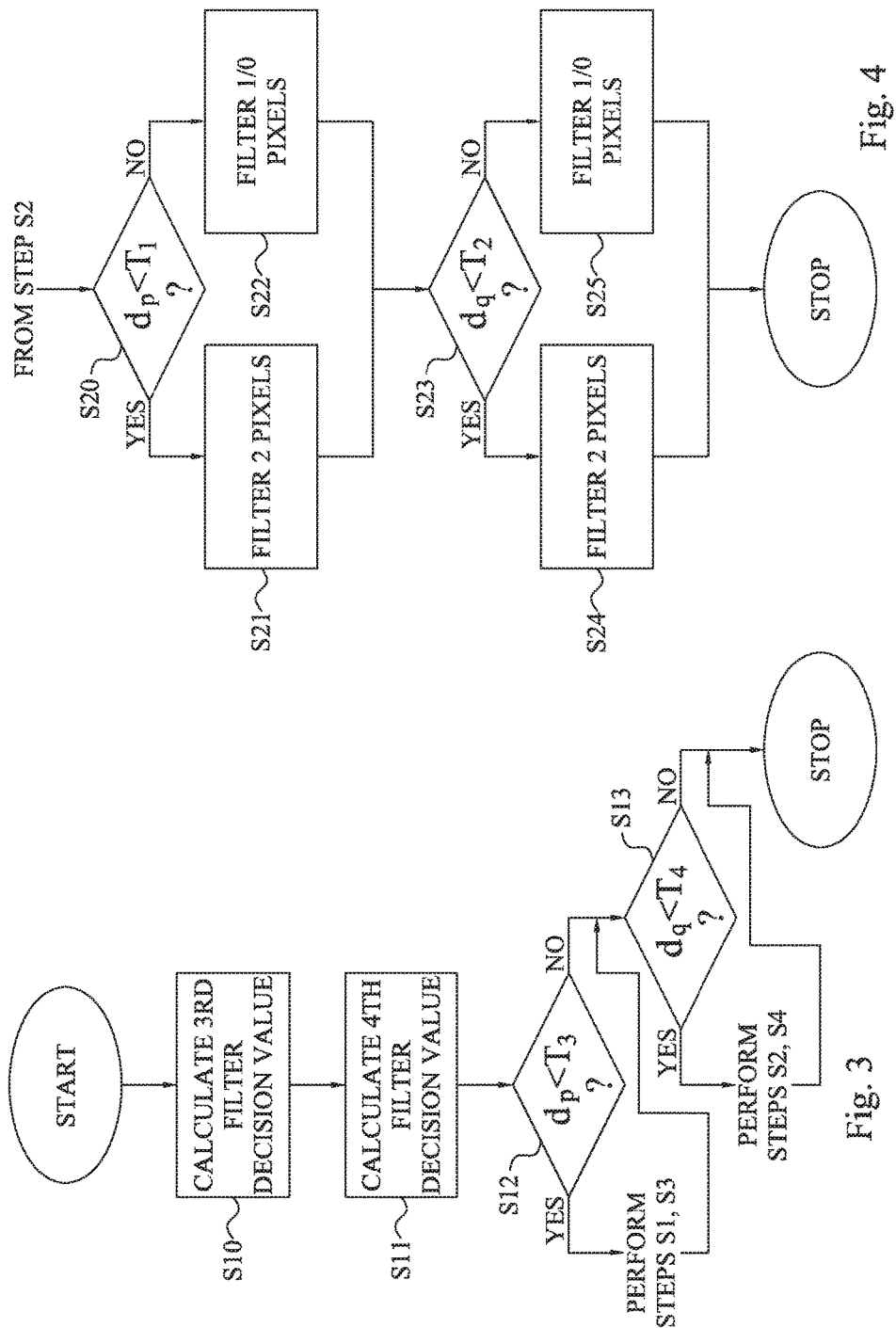

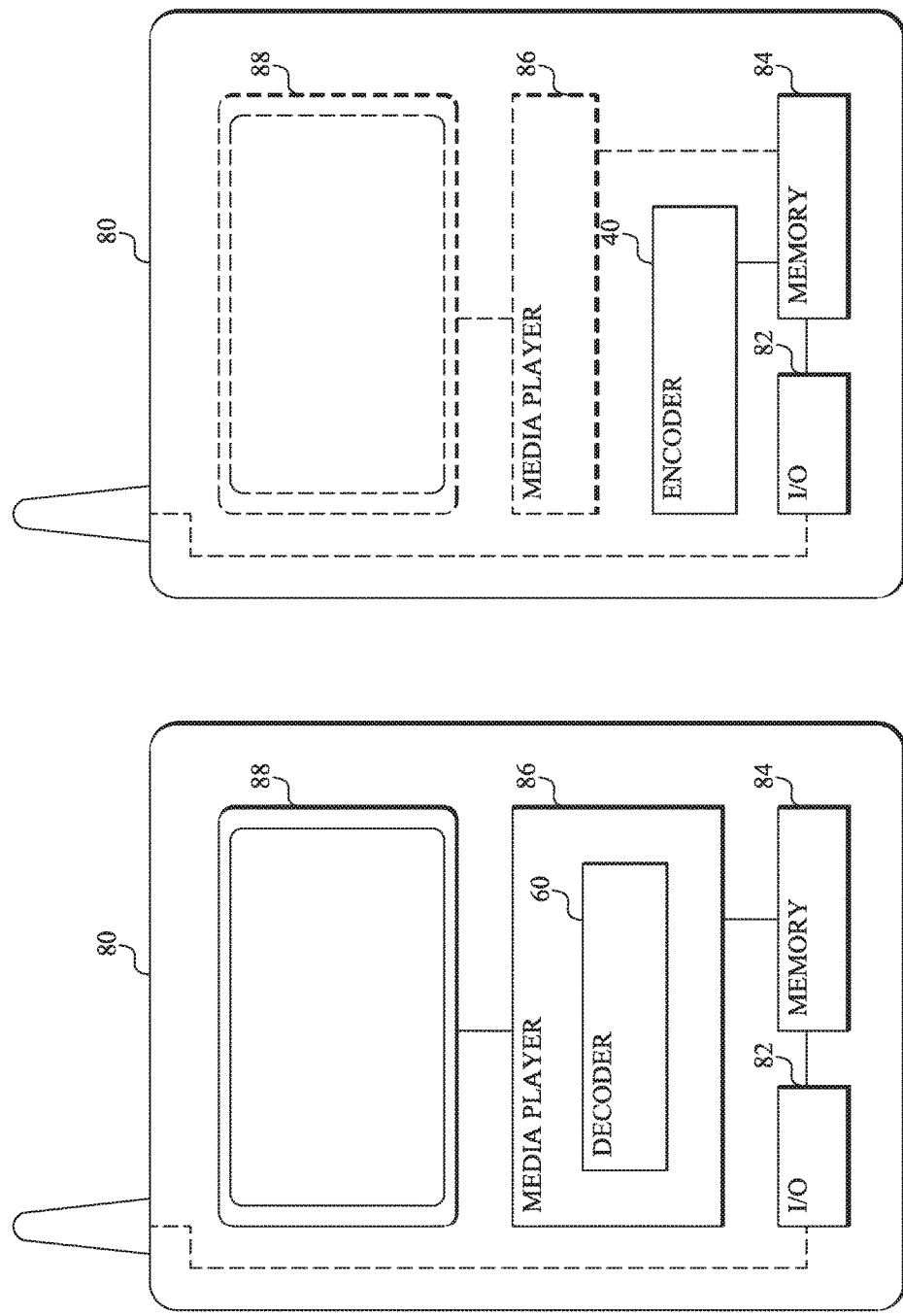

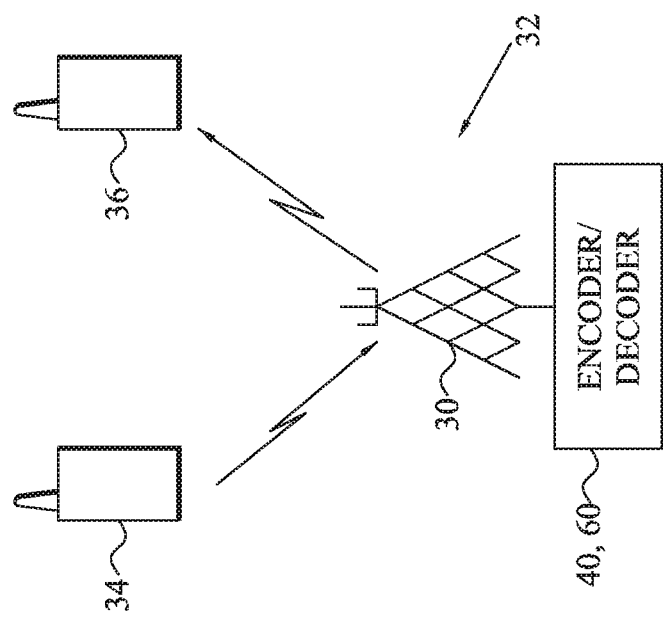

DEBLOCKING FILTERING CONTROL

TECHNICAL FIELD

The present embodiments generally relate to filtering control and in particular to controlling deblocking filtering over block boundaries in a video frame.

BACKGROUND

Deblocking filters are used in the video coding standards in order to combat blocking artifacts. The blocking artifacts arise because the original video frames are split into blocks which are processed relatively independently. The blocking artifacts can, for instance, arise due to different intra predictions of the blocks, quantization effects and motion compensation. Two particular variants of deblocking are described below.

In state of the art video coding, such as H.264, there is a deblocking filter, also denoted loop filter, after prediction and residual reconstruction, but before storage of the reconstruction for later reference when encoding or decoding the subsequent frames. The deblocking filtering consists of several steps such as filter decisions, filtering operations, a clipping function and changes of pixel values. The decision to filter the border or not is made based on evaluation of several conditions. Filter decisions depend on macroblock (MB) type, motion vector (MV) difference between neighboring blocks, whether neighboring blocks have coded residuals and on the local structure of the current and/or neighboring blocks.

Then the amount of filtering for a pixel depends, among others, on the position of that pixel relative to the block border or boundary and on the quantization parameter (QP) value used for residual coding.

The filter decision is based on comparing three pixel differences with thresholds. The thresholds are adapted to the quantization parameter (QP). For instance, assume a vertical block boundary of:

abcd|efgh where a, b c and d denote the pixel values of the pixels of a row of pixels in the current block and e, f, g and h denote the corresponding pixel values of the pixels of a corresponding row of pixels in the neighboring block. If the following conditions are fulfilled the filter decision is positive, e.g. abs(d−e)<thr1, abs(c−d)<thr2, and abs(e−f)<thr2, where thr1 and thr2 are adapted based on QP.

There are two filtering modes in H.264. In the first filtering mode, referred to as normal filtering, filtering can be described with a delta value with which filtering changes the current value. The filtering for the pixels closest to the block boundary is d'=d+delta and e'=e−delta, where delta has been clipped off to a threshold ±thr3 to a value that is constrained by the QP. More filtering is thereby allowed for high QP than for low QP. Clipping can be described as delta_clipped=max (−thr3, min(thr3, delta)), where thr3 is controlling the filter strength. A larger value of thr3 means that the filtering is stronger which means that a stronger low-pass filtering effect will happen.

The filter strength can be increased if any of the following two conditions also holds, e.g. abs(b−d)<thr2 and abs(e−g)< thr2. The filter strength is adapted by clipping the delta less, e.g. allow for more variation.

The second filtering mode, referred to as strong filtering, is applied for intra macroblock boundaries only, when the following condition is fulfilled abs(d−e)<thr1/4.

For more information of deblocking filtering in H.264 reference is made to List et al., Adaptive Deblocking Filter, *IEEE Transactions on Circuits and Systems for Video Technology*, vol. 13, no. 7, July 2003.

In the draft HEVC (High Efficiency Video Coding) specification "Test Model under Consideration", ITU-T SG16 WP3 document, JCTVC-B205, Chapter 6.5 In-loop filter process, the deblocking filter works differently from H.264. The filtering is performed if at least one of the blocks on the side of the boundary is intra, or has non-zero coefficients, or the difference between the motion vector components of the blocks is greater or equal to one integer pixel. For example, when filtering the border between the blocks with a vertical block boundary of $$p3_i p2_i p1_i p0_i | q0_i q1_i q2_i q3_i$$

with $pj_i$ denoting the pixel value of pixel number j of row number i in the current block and $qj_i$ denoting the pixel value of pixel number j of row number i in the neighboring block, i=0 . . . 7, j=0 . . . 3, then the following condition should also be satisfied:

$$d=|p2_2-2\times p1_2+p0_2|+|q2_2-2\times q1_2+q0_2|+|p2_5-2\times p1_5+p0_5|+|q2_5-2\times q1_5+q0_5|<\beta$$

where β depends on QP. In the above mentioned HEVC specification, there is a table of β, where β increases with QP.

If the conditions are fulfilled and filtering is done between the current block and the neighboring block, one of two types of filtering is performed, referred to as weak and strong filtering, respectively. The choice between the strong and the weak filtering is done separately for each line depending on the following conditions. For each line i= 0 . . . 7, the strong filtering is performed if all the following conditions are true, otherwise, weak filtering is performed:

$$d<(\beta>>2)$$

$$(|p3_i-p0_i|+|q0_i-q3_i|)<(\beta>>3)$$

$$|p0_i-q0_i|<((5\times t_C+1)>>1)$$

where $t_C$ and β depend on QP and >> denotes a right shift operator.

Weak filtering is performed based on the above conditions. The actual filtering works by computing an offset (Δ), adding it to the original pixel value and clip the sum to a filtered output pixel value in the range of 0-255:

$$\Delta=\text{Clip}(-t_C, t_C,(13\times(q0_i-p0_i)+4\times(q1_i-p1_i)-5\times(q2_i-p2_i)+16)>>5))$$

$$p0_i=\text{Clip}_{0-255}(p0_i+\Delta)$$

$$q0_i=\text{Clip}_{0-255}(q0_i-\Delta)$$

$$p1_i=\text{Clip}_{0-255}(p1_i+\Delta/2)$$

$$q1_i=\text{Clip}_{0-255}(q1_i-\Delta/2)$$

where the clip function Clip(A, B, x) is defined as Clip(A, B, x)=A if x<A, Clip(A, B, x)=B if x>B and Clip(A, B, x)=x if A≤x≤B and $\text{Clip}_{0-255}(x)$ is defined as Clip(0, 255, x).

Strong filtering mode is performed by the following set of operations:

$$p0_i=\text{Clip}_{0-255}((p2_i+2\times p1_i+2\times p0_i+2\times q0_i+q1_i+4)>>3)$$

$$q0_i=\text{Clip}_{0-255}((p1_i+2\times p0_i+2\times q0_i+2\times q1_i+q2_i+4)>>3)$$

$$p1_i=\text{Clip}_{0-255}((p2_i+p1_i+p0_i+q0_i+2)>>2)$$

$$q1_i = \text{Clip}_{0\text{-}255}((p0_i + q0_i + q1_i + q2_i + 2) >> 2)$$

$$p2_i = \text{Clip}_{0\text{-}255}((2 \times p3_i + 3 \times p2_i + p1_i + p0_i + q0_i + 4) >> 3)$$

$$q2_i = \text{Clip}_{0\text{-}255}((p0_i + q0_i + q1_i + 3 \times q2_i + 2 \times q3_i + 4) >> 3)$$

Deblocking filtering decisions according to HEVC can lead to inaccurate deblocking filtering over block boundaries for certain blocks. In particular, neighboring blocks having different levels of local structures could be handled incorrectly in HEVC by filtering one of the blocks too much to thereby represses and filter away local structures in the block.

SUMMARY

Hence, there is a need for an efficient deblocking filtering control that can be used to reduce blocking artifacts at block boundaries and that does not have the above-mentioned drawbacks.

It is a general objective to provide an efficient deblocking filtering control.

It is a particular objective to provide asymmetric filtering decisions over a block boundary.

An aspect of the embodiments relates to a method for filtering control applicable to a block of multiple pixels in a video frame, where each pixel has a respective pixel value. The method comprises calculating a first filter decision value for the block based at least on $|p2_i - 2p1_i + p0_i|$, wherein $p0_i$ denotes a pixel value of a pixel closest to, in a first line of pixels in the block, a block boundary to a neighboring block of multiple pixels in the video frame, $p1_i$ denotes a pixel value of a pixel next closest to, in the first line of pixels, the block boundary and $p2_i$ denotes a pixel value of a pixel second next closest to, in the first line of pixels, the block boundary. The method also comprises calculating a second filter decision value for the block based at least on $|q2_i - 2q1_i + q0_i|$, wherein $q0_i$ denotes a pixel value of a pixel in the neighboring block closest to, in a corresponding first line of pixels in the neighboring block, the block boundary, $q1_i$ denotes a pixel value of a pixel of the neighboring block next closest to, in the corresponding first line of pixels, the block boundary and $q2_i$ denotes a pixel value of a pixel in the neighboring block second next closest to, in the corresponding first line of pixels, the block boundary. The first filter decision value is used to determine how many pixels in a line of pixels in the block to filter relative to the block boundary and the second filter decision value is correspondingly used to determine how many pixels in a corresponding line of pixels in the neighboring block to filter relative to the block boundary.

Another aspect of the embodiments defines a filtering control device comprising a first decision value calculator configured to calculate a first filter decision value for a block of multiple pixels in a video frame based at least on $|p2_i - 2p1_i + p0_i|$, wherein $p0_i$ denotes a pixel value of a pixel closest to, in a first line of pixels in the block, a block boundary to a neighboring block of multiple pixels in the video frame, $p1_i$ denotes a pixel value of a pixel next closest to, in the first line of pixels, the block boundary and $p2_i$ denotes a pixel value of a pixel second next closest to, in the first line of pixels, the block boundary. The filtering control device also comprises a second decision value calculator configured to calculate a second filter decision value for the block based at least on $|q2_i - 2q1_i + q0_i|$, wherein $q0_i$ denotes a pixel value of a pixel in the neighboring block closest to, in a corresponding first line of pixels in the neighboring block, the block boundary, $q1_i$ denotes a pixel value of a pixel of the neighboring block next closest to, in the corresponding first line of pixels, the block boundary and $q2_i$ denotes a pixel value of a pixel in the neighboring block second next closest to, in the corresponding first line of pixels, the block boundary. A first pixel determiner is configured to determine how many pixels in a line of pixels in the block to filter relative to the block boundary based on the first filter decision value calculated by the first decision value calculator. The filtering control device further comprises a second pixel determiner configured to determine how many pixels in a corresponding line of pixels in the neighboring block to filter relative to the block boundary based on the second filter decision value calculated by the second decision value calculator.

Further aspects of the embodiments relate to an encoder comprising a filtering control device as defined above and a decoder comprising a filtering control device as defined above.

Yet another aspect defines a user equipment comprising a memory configured to store video frames and an encoder with a filtering control device as defined above to encode the video frames into encoded video frames, which are stored in the memory. A further aspect defines a user equipment comprising a memory configured to store encoded video frames and a decoder with a filtering control device as defined above to decode the encoded video frames into decoded video frames. A media player of the user equipment is configured to render the decoded video frames into video data displayable on a display.

Yet another aspect relates to a computer program for filtering control of a block of multiple pixels in a video frame, where each pixel has a respective pixel value. The computer program comprises code means which when run on a computer causes the computer to calculate a first filter decision value for the block based at least on $|p2_i - 2p1_i + p0_i|$, wherein $p0_i$ denotes a pixel value of a pixel closest to, in a first line of pixels in the block, a block boundary to a neighboring block of multiple pixels in the video frame, $p1_i$ denotes a pixel value of a pixel next closest to, in the first line of pixels, the block boundary and $p2_i$ denotes a pixel value of a pixel second next closest to, in the first line of pixels, the block boundary. The computer also comprises code means which causes the computer to calculate a second filter decision value for the block based at least on $|q2_i - 2q1_i + q0_i|$, wherein $q0_i$ denotes a pixel value of a pixel in the neighboring block closest to, in a corresponding first line of pixels in the neighboring block, the block boundary, $q1_i$ denotes a pixel value of a pixel of the neighboring block next closest to, in the corresponding first line of pixels, the block boundary and $q2_i$ denotes a pixel value of a pixel in the neighboring block second next closest to, in the corresponding first line of pixels, the block boundary. The computer program comprises code means which causes the computer to determine how many pixels in a line of pixels in the block to filter relative to the block boundary based on the first filter decision value and determine how many pixels in a corresponding line of pixels in the neighboring block to filter relative to the block boundary based on the second filter decision value.

The embodiments achieve asymmetric deblocking decisions that control deblocking filtering to be adaptive to the structure on each side of a block boundary. The asymmetric decisions mean that the amount of filtering applied to one side of the block boundary can differ from the amount of filtering applied to the other side of the block boundary, thus providing additional adaptation to the local structure. This improves the objective and subjective video quality.

BRIEF DESCRIPTION OF THE DRAWINGS

The invention, together with further objects and advantages thereof, may best be understood by making reference to the following description taken together with the accompanying drawings, in which:

FIG. 3 is a flow diagram illustrating additional, optional steps of the method in FIG. 1 according to an embodiment;

FIG. 4 is a flow diagram illustrating an embodiment of the determining steps in FIG. 1;

FIG. 15 is a schematic block diagram of a user equipment according to an embodiment;

FIG. 16 is a schematic block diagram of a user equipment according to another embodiment; and FIG. 17 is a schematic overview of a portion of a communication network comprising a network device according to an embodiment.

DETAILED DESCRIPTION

Figures 1, 2A, 2B:
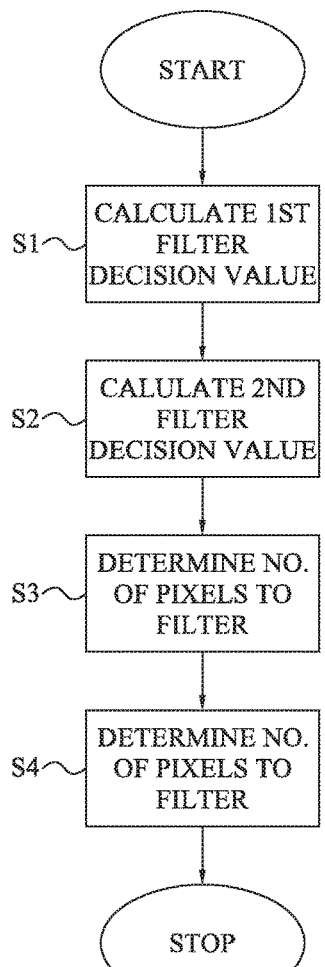
FIG. 1 is a flow diagram of a method for filtering control according to an embodiment.
FIGS. 2A and 2B illustrate two embodiments of neighboring blocks and a block boundary over which deblocking filtering can be applied.

Throughout the drawings, the same reference numbers are used for similar or corresponding elements.

The embodiments generally relate to filtering control and controlling deblocking filtering over block boundaries in a video frame. The filtering control of the embodiments provides asymmetric deblocking decisions with regard to block boundaries by making independent filtering decisions for the blocks of pixels separated by a block boundary. This means that the deblocking filtering can handle neighboring blocks having different levels of local structures to thereby adapt the particular deblocking filtering at each block based on its local structures.

As is well-known in the art, a video frame is divided into non-overlapping blocks of pixels that are encoded and decoded according to the various available intra and inter coding modes. Generally, a video frame is divided into non-overlapping macroblocks of 16×16 pixels. Such a macroblock can in turn be divided into smaller blocks of different sizes, such as 4×4 or 8×8 pixels. However, also rectangular blocks are possible according to the embodiments, such as, 4×8, 8×4, 8×16 or 16×8. The embodiments can be applied to any such block of pixels, including macroblocks or even larger blocks of pixels.

In the emerging High Efficiency Video Coding (HEVC) standard, coding units (CU), prediction units (PU) and transform units (TU) are used. The prediction units are defined inside a coding unit and contain the intra or inter prediction modes. Transform units are defined inside a coding unit and the largest transform size is 32×32 pixels and the smallest size is 4×4 pixels. The CU size is currently varying from 64×64 pixels (largest) to 8×8 pixels (smallest). In this way, the largest CU can be split into smaller CUs with the "level of granularity" depending on the local characteristics of the frame. That means that the largest CU may be split into smaller CUs of different sizes. The embodiments can also be used in connection with such coding units, which are regarded as being encompassed by the expression "block of pixels" as used herein.

Each pixel in the block has a respective pixel value. Video frames generally have color values assigned to the pixels, where the color values are represented in a defined color formats. One of the common color formats uses one luminance component and two chrominance components for each pixel, although other formats exist, such as using red, green and blue components for each pixel.

Traditionally, luminance component filtering and chrominance component filtering are done separately, possibly employing different filtering decisions and different deblocking filters. It is, though, possible that the luminance filtering decisions are used in chroma filtering, like in H.264. The embodiments can be applied to filtering control for the luminance component, the chrominance component or both the luminance component and the chrominance component. In a particular embodiment, the embodiments are applied to control luminance or luma filtering. Filtering decisions, or parts of filtering decisions for one component, such as luma, can be then used when making the filtering decisions for other components, such as chroma.

Deblocking filtering is conducted over a boundary, edge or border between neighboring blocks. As a consequence, such boundaries can be vertical boundaries 1, see FIG. 2A, between two neighboring blocks 10, 20 present side by side in the video frame. Alternatively, the boundaries are horizontal boundaries 1, see FIG. 2B, between two neighboring block 10, 20, where one block 10 is positioned above the other block 20 in the video frame. In a particular embodiment, vertical boundaries are filtered first starting from the left-most boundary and proceeding through the boundaries towards the right-hand side in their geometrical order. Then, horizontal boundaries are filtered starting with the boundary on the top and proceeding through the boundaries towards the bottom in their geometrical order. The embodiments are, however, not limited to this particular filtering order and can actually be applied to any predefined filtering order. In a particular embodiment, the boundaries at the edge of the video frame are preferably not filtered and thereby excluded from the deblocking filtering.

FIG. 1 is a flow diagram of a method for filtering control applicable to a block of multiple pixels in a video frame according to an embodiment. The method of FIG. 1 generally starts in step S1 where a first filter decision value is calculated for the block based at least on $|p2_i - 2p1_i + p0_i|$, wherein $p0_i$ denotes a pixel value of a pixel 11 closest to, in a first line of pixels 11, 13, 15, 17 in the block 10, a block boundary 1 to a neighboring block 20 of multiple pixels 21, 23, 25, 27 in the video frame. $p1_i$ denotes a pixel value of a pixel 13 next closest to, in the first line 12 of pixels 11, 13, 15, 17, the block boundary 1 and $p2_i$ denotes a pixel value of a pixel 15 second next closest to, in the first line 12 of pixels 11, 13, 15, 17, the block boundary 10.

Step S2 correspondingly calculates a second filter decision value for the block based at least on $|q2_i-2q1_i+q0_i|$, wherein $q0_i$ denotes a pixel value of a pixel 21 in the neighboring block 20 closest to, in a corresponding first line 22 of pixels 21, 23, 25, 27 in the neighboring block 20, the block boundary 1, $q1_i$ denotes a pixel value of a pixel 23 of the neighboring block 20 next closest to, in the corresponding first line 22 of pixels 21, 23, 25, 27, the block boundary 1 and $q2_i$ denotes a pixel value of a pixel 25 in the neighboring block 20 second next closest to, in the corresponding first line 22 of pixels 21, 23, 25, 27, the block boundary 1.

The first line 12 of pixels 11, 13, 15, 17 in the block 10 and the corresponding first line 22 of pixels 21, 23, 25, 27 in the neighboring block 20 belong to the same horizontal line of pixels, i.e. row of pixels, extending over a vertical boundary 1, see FIG. 2A, or belong to the same vertical line of pixels, i.e. column of pixels, extending over a horizontal boundary 1, see FIG. 2B. Hence, the first line 12 of pixels 11, 13, 15, 17 and the corresponding first line 22 of pixels 21, 23, 25, 27 are perpendicular to the block boundary 1 between the block 10 and the neighboring block 20. Furthermore, the first line 12 of pixels 11, 13, 15, 17 in the block 10 and the corresponding first line 22 of pixels 21, 23, 25, 27 in the neighboring block 20 have the same line number. For instance, if the block 10 and the neighboring block 20 each comprises N, such as eight, rows or columns of pixels, having row or column numbers i=0 . . . N−1 then the first line 10 of pixels 11, 13, 15, 17 has line number i in the block 10 and the corresponding first line 20 of pixels 21, 23, 25, 27 also has line number i but in the neighboring block 20. Thus, first line 12 of pixels 11, 13, 15, 17 in the block and the corresponding first line 22 of pixels 21, 23, 25, 27 in the neighboring block 20 are opposing lines with regard to the block boundary 1.

According to the embodiments, "line of pixels" and "corresponding line of pixels" are employed to denote a "row of pixels" and a "corresponding row of pixels" in the case of a vertical block boundary as in FIG. 2A and denote a "column of pixels" and a "corresponding column of pixels" in the case of a horizontal block boundary as in FIG. 2B.

The first line 12 of pixels 11, 13, 15, 17 and the corresponding first line 22 of pixels 21, 23, 25, 27 could be predefined lines in the block 10 and the neighboring block 20, respectively. Thus, the first line 12 of pixels 11, 13, 15, 17 and the corresponding line 22 of pixels 21, 23, 25, 27 have a predefined and fixed line number i with regard to each block boundary 1 for which a filtering control is applied. Alternatively, the first line 12 of pixels 11, 13, 15, 17 and the corresponding first line 22 of pixels 21, 23, 25, 27 could represent a current line and a current corresponding line, respectively, which is further discussed herein.

The calculation of the first filter decision value in step S1 and the calculation of the second filter decision value in step S2 can be performed serially in any order, i.e. step S1 preceding step S2 or step S2 preceding step S1, or at least partly in parallel. The results of these two steps S1, S2 is, thus, a first filter decision value that is calculated based on pixel values in the block 10 and a second filter decision value that is calculated based on pixel values in the neighboring block 20 on the other side of the block boundary 1 relative to the block 10. More preferably, the calculation of the first decision value is performed only based on pixel values in the block 10 and therefore not based on any pixel values in the neighboring block 20. Correspondingly, the second filter decision value is preferably calculated based only on pixel values in the neighboring block 20 and not based on any pixel values in the block 10. The first filter decision value calculated in step S1 is then used in step S3 to determine how many pixels in a line 12 of pixels 11, 13, 15, 17 in the block 10 to filter relative to the block boundary 1. The second filter decision value is correspondingly used in step S4 to determine how many pixels in a corresponding line 22 of pixels 21, 23, 25, 27 in the neighboring block 20 to filter relative to the block boundary 1. Thus, separate filter decision values are calculated for each side or part of a row or column of pixels extending over the block boundary 1 and a respective filter decision is taken for each side or part based on the particular filter decision value calculated for that side or part.

This should be compared to the prior art where a single or a set of filter decision values is calculated for a line of pixels and the corresponding line of pixels and where this filter decision value or set of filter decision values is used to decide how many pixels to filter on both sides of the block boundary. Thus, in the prior art the same number of pixels is always filtered for the corresponding line of pixels in the neighboring block as is done for the matching line of pixels in the block.

The present embodiments instead enable an asymmetric filtering control and deblocking filtering by making a separate filter decision for the line 12 of pixels 11, 13, 15, 17 in the block 10 and another, different filter decision for the corresponding line 22 of pixels 21, 23, 25, 27 in the neighboring block 20. This means that based on the particular first and second filter decision values different or the same number of pixels in the line 12 of pixels 11, 13, 15, 17 could be selected for deblocking filtering and modification as the number of pixels in the corresponding line 22 of pixels 21, 23, 25, 27 that are selected for deblocking filtering and modification.

Generally, herein $pX_y$ denotes the pixel value of pixel number X relative to the block boundary 1 in a line of pixels having line number y in the block 10. Correspondingly, $qX_y$ denotes the pixel value of pixel number X relative to block boundary 1 in a corresponding line of pixels having line number y in the neighboring block 20.

Steps S3 and S4 can be performed serially in any order or indeed at least partly in parallel.

In a first embodiment, steps S1 and S2 could be performed once for a given block boundary 1 between the block 10 and the neighboring block 20 to thereby calculate a first filter decision value and a second filter decision value that applies to all lines 12 of pixels 11, 13, 15, 17 in the block 10 and to all corresponding lines 22 of pixels 21, 23, 25, 27 in the neighboring block 20, respectively. In such approach the same first number of pixels are preferably filtered and modified in each line 12 of pixels 11, 13, 15, 17 in the block 10 with regard to the block boundary 1, where this first number is determined based on the first filter decision value calculated in step S1. Correspondingly, the same second number of pixels are preferably filtered and modified in each corresponding line 22 of pixels 21, 23, 25, 27 in the neighboring block 20 with regard to the block boundary 1, where this second number is determined based on the second filter decision value calculated in step S2.

Alternatively, in a second embodiment the first filter decision value and the second filter decision value applies to a subset of the lines 12 of pixels 11, 13, 15, 17 in the block 10 and to a corresponding subset of the corresponding lines 22 of pixels 21, 23, 25, 27 in the neighboring block 20. For instance, a pair of filter decision values could be used for the first four lines 12 of pixels 11, 13, 15, 17 in the block and the first four corresponding lines 22 of pixels 21, 23, 25, 27 in the neighboring block 20 and with another pair of filter decision values used for the remaining four lines 12 of pixels 11, 13, 15, 17 in the block and the remaining four corresponding lines 22 of pixels 21, 23, 25, 27 in the neighboring block 20.

In a third embodiment the calculation in step S1 is performed for each line 12 of pixels 11, 13, 15, 17 in the block 10 and a separate determination in step S3 is then performed for each such line 12 of pixels 11, 13, 15, 17. In such a case, the calculation in step S2 is correspondingly performed for each corresponding line 22 of pixels 21, 23, 25, 27 in the neighboring block 20 and a separate determination in step S4 is performed for each such corresponding line 22 of pixels 21, 23, 25, 27.

Thus, in the third embodiment step S3 comprises determining how many pixels in the first line 12 of pixels 11, 13, 15, 17 in the block 10 to filter relative to the block boundary 1 based on the first filter decision value calculated in step S1. Step S4 comprises determining how many pixels in the corresponding first line 22 of pixels 21, 23, 25, 27 in the neighboring block 20 to filter relative to the block boundary 1 based on the second filter decision value calculated in step S2.

The following part describes how the third embodiment is applied separately for each line (row or column) crossing the block boundary 1. In this example the first filter decision value is defined as $d_{pi}=|p2_i-2p1_i+p0_i|$ and the second filter decision value is defined as $d_{qi}=|q2_i-2q1_i+q0_i|$. The method then comprises:

- Calculate $d_{pi}$, calculate $d_{qi}$ for each line i crossing the block boundary.
- if $d_{pi}$ < thr1
  - do normal filtering of line i of current block 10, e.g. filter and modify two pixels from the block border or boundary;
- else, i.e. if $d_{pi}$ ≥ thr1
  - do not filter the second pixel from the block border or boundary of line i of the current block 10 or do not filter any pixels at all on line i of the current block 10;
- if $d_{qi}$ < thr2
  - do normal filtering of line i of neighboring block 20, e.g. filter and modify two pixels from the block border or boundary 1;
- else, i.e. if $d_{qi}$ ≥ thr2
  - do not filter the second pixel from the block border or boundary 1 of line i of the neighboring block 20 or do not filter any pixels at all on line i of the neighboring block 20.

As is illustrated by the example above, the third embodiment of the method in FIG. 1 can calculate separate first and second filter decision values and therefore make separate determinations of how many pixels to filter for each row or column in the block 10 and the neighboring block 20 relative to the block boundary 1. Thus, in this third embodiment the first and second filter decision values are line-specific filter decision values, i.e. calculated for each line 12 of pixels 11, 13, 15, 17 in the block 10 and for each corresponding line 22 of pixels 21, 23, 25, 27 in the neighboring block 20.

In the first embodiment, block-specific filter decision values are used. Thus, in such a case a single first filter decision value could be calculated for the block 10 relative to the block boundary 1 and apply to all lines 12 of pixels 11, 13, 15, 17 in the block 10 with regard to the particular block boundary 1. Correspondingly a single second filter decision value is calculated for the neighboring block 20 relative to the block boundary 1 and applies to all corresponding lines 22 of pixels 21, 23, 25, 27 in the neighboring block 20 with regard to the particular block boundary 1.

A first example of this first embodiment involves calculating a first filter decision value as $|p2_2-2p1_2+p0_2+p2_5-2p1_5+p0_5|$, wherein $p0_2$ denotes the pixel value of the pixel closest to, in the first line of pixels, the block boundary 1, $p1_2$ denotes the pixel value of the pixel next closest to, in the first line of pixels, the block boundary 1. $p2_2$ denotes the pixel value of the pixel second next closest to, in the first line of pixels, the block boundary 1, $p0_5$ denotes a pixel value of a pixel closest to, in a second line of pixels in the block 10, the block boundary 1, $p1_5$ denotes a pixel value of a pixel next closest to, in the second line of pixels, the block boundary 1 and $p2_5$ denotes a pixel value of a pixel second next closest to, in the second line of pixels, the block boundary 1.

The second filter decision value is then preferably calculated as $|q2_2-2q1_2+q0_2+q2_5-2q1_5+q0_5|$, wherein $q0_2$ denotes the pixel value of the pixel in the neighboring block 20 closest to, in the corresponding first line of pixels, the block boundary 1, $q1_2$ denotes the pixel value of the pixel of the neighboring block 20 next closest to, in the corresponding first line of pixels, the block boundary 1, $q2_2$ denotes the pixel value of the pixel in the neighboring block 20 second next closest to, in the corresponding first line of pixels, the block boundary 1, $q0_5$ denotes a pixel value of a pixel in the neighboring block 20 closest to, in a corresponding second line of pixels in the neighboring block 20, the block boundary 1, $q1_5$ denotes a pixel value of a pixel of the neighboring block 20 next closest to, in the corresponding second line of pixels, the block boundary 1 and $q2_5$ denotes a pixel value of a pixel in the neighboring block 20 second next closest to, in the corresponding second line of pixels, the block boundary 1.

The first filter decision value is then used for all lines 12 of pixels 11, 13, 15, 17 in the block 10 when determining how many pixels to filter and the second filter decision value is used for all corresponding line 22 of pixels 21, 23, 25, 27 in the neighboring block 20 when determining how many pixels to filter.

In this first example of the first embodiment, the first line of pixels corresponds to line i=2 and the corresponding first line corresponds to corresponding line i=2 and the second line of pixels corresponds to line i=5 and the second corresponding line corresponds to corresponding line i=5. In this case the block 10 preferably comprises eight lines and the neighboring block 20 preferably also comprises eight lines, i.e. i=0-7.

The following part illustrates an implementation example of the first embodiment. In this implementation example the first filter decision value is defined as $d_p=|p2_2-2p1_2+p0_2|+|p2_5-2p1+p0_5|$ and the second filter decision value is defined as $d_q=|q2_2-2q1_2+q0_2|+|q2_5-2q1_5+q0_5|$.

- Calculate $d_p$, calculate $d_q$;
- if $d_p$ < thr1
  - do normal filtering of current block 10, e.g. filter and modify two pixels from the block border or boundary 1;
- else, i.e. if $d_p$ ≥ thr1
  - do not filter the second pixel from the block border or boundary 1 or do not filter any pixels at all;
- if $d_q$ < thr2
  - do normal filtering of neighboring block 20, e.g. filter and modify two pixels from the block border or boundary 1;
- else, i.e. if $d_q$ ≥ thr2

○ do not filter the second pixel from the block border or boundary 1 or do not filter any pixels at all.

In a second example of the first embodiment the first filter decision value is calculated as a block-specific filter decision value based on pixel values in line i=3 and line i=4 instead of line i=2 and line i=5. The corresponding lines i=3 and i=4 in the neighboring block 20 are preferably then used for calculating the second filter decision value. The first filter decision value could then be calculated as $|p2_3-2p1_3+p0_3|+|p2_4-2p1_4+p0_4|$ and the second filter decision value is calculated as $|q2_3-2q1_3+q0_3|+|q2_4-2q1_4+q0_4|$, wherein $p0_3$ denotes the pixel value of the pixel closest to, in the first line of pixels, the block boundary 1, $p1_3$ denotes the pixel value of the pixel next closest to, in the first line of pixels, the block boundary 1, $p2_3$ denotes the pixel value of the pixel second next closest to, in the first line of pixels, the block boundary 1, $p0_4$ denotes a pixel value of a pixel closest to, in a second line of pixels in the block 10, the block boundary 1, $p1_4$ denotes a pixel value of a pixel next closest to, in the second line of pixels, the block boundary 1 and $p2_4$ denotes a pixel value of a pixel second next closest to, in the second line of pixels, the block boundary 1 and $q0_3$ denotes the pixel value of the pixel in the neighboring block 20 closest to, in the corresponding first line of pixels, the block boundary 1, $q1_3$ denotes the pixel value of the pixel of the neighboring block 20 next closest to, in the corresponding first line of pixels, the block boundary 1, $q2_3$ denotes the pixel value of the pixel in the neighboring block 20 second next closest to, in the corresponding first line of pixels, the block boundary 1, $q0_4$ denotes a pixel value of a pixel in the neighboring block 20 closest to, in a corresponding second line of pixels in the neighboring block 20, the block boundary 1, $q1_4$ denotes a pixel value of a pixel of the neighboring block 20 next closest to, in the corresponding second line of pixels, the block boundary 1 and $q2_4$ denotes a pixel value of a pixel in the neighboring block 20 second next closest to, in the corresponding second line of pixels, the block boundary 1.

In the second embodiment a first filter decision value and a second filter decision value are calculated for a group of four lines of pixels and four corresponding lines of pixels. This second embodiment can be suitable if the block and the neighboring block each have a size of 4×4 pixels. In addition, the second embodiment could also be used for larger blocks of pixels, such as 8×8 pixels. In the latter case, a pair of filter decisions is calculated for the first four lines pixels and first four corresponding lines of pixels and another pair of filter decisions is calculated for the remaining four lines of pixels and the remaining four corresponding lines of pixels.

A first example of the second embodiment calculates the first filter decision value as $|p2_0-2p1_0+p0_0|+|p2_3-2p1_3+p0_3|$ and the second filter decision value as $|q2_0-2q1_0+q0_0|+|q2_3-2q1_3+q0_3|$. In such a case, the line of pixels and the corresponding line of pixels could run from line number i=0 to line number i=3. For larger blocks of pixels, such as i=0-7 as shown in FIGS. 2A and 2B, the first pair of a first filter decision value and a second filter decision value is calculated as $|p2_0-2p1_0+p0_0|+|p2_3-2p1_3+p0_3|$ and $|q2_0-2q1_0+q0_0|+|q2_3-2q1_3+q0_3|$. This first pair of filter decision values is applicable to the first four lines of pixels and first four corresponding line of pixels, i.e. i=0-3. The second pair of a first filter decision value and a second filter decision value is then calculated as $|p2_4-2p1_4+p0_4|+|p2_7-2p1_7+p0_7|$ and $|q2_4-2q1_4+q0_4|+|q2_7-2q1_7+q0_7|$. The second pair of filter decision values is then applicable to the four last line of pixels and the four last corresponding line of pixels, i.e. i=4-7.

A second example of the second embodiment calculates the first filter decision value as $|p2_1-2p1_1+p0_1|+|p2_2-2p1_2+p0_2|$ and the second filter decision value as $|q2_1-2q1_1+q0_1|+|q2_2-2q1_2+q0_2|$. In such a case, the line of pixels and the corresponding line of pixels could run from line number i=0 to line number i=3. For larger blocks of pixels, such as i=0-7 as shown in FIGS. 2A and 2B, the first pair of a first filter decision value and a second filter decision value is calculated as $|p2_1-2p1_1+p0_1|+|p2_2-2p1_2+p0_2|$ and $|q2_1-2q1_1+q0_1|+|q2_2-2q1_2+q0_2|$. This first pair of filter decision values is applicable to the first four lines of pixels and first four corresponding line of pixels, i.e. i=0-3. The second pair of a first filter decision value and a second filter decision value is then calculated as $|p2_5-2p1_5+p0_5|+|p2_6-2p1_6+p0_6|$ and $|q2_5-2q1_5+q0_5|+|q2_6-2q1_6+q0_6|$. The second pair of filter decision values is then applicable to the four last line of pixels and the four last corresponding line of pixels, i.e. i=4-7.

This concept of the second embodiment can be extended to the case where the first filter decision value is calculated based on the pixel values of pixels present in a subset of the lines of pixels in the block and the second filter decision value is calculated based on the pixel values of pixels present in a subset of the corresponding lines of pixels in the neighboring block. Thus, in this general concept of the second embodiment the first filter decision value could be calculated as $|p2_i-2p1_i+p0_i|+|p2_j-2p1_j+p0_j|$, wherein i, j represent different line numbers in the interval 0 to N−1, with N denoting the total number of lines of pixels in the block and the neighboring block and i≠j. The second filter decision value is then preferably calculated as $|q2_i-2q1_i+q0_i|+|q2_j-2q1_j+q0_j|$. This concept can of course be extended with the subset containing more than two of the lines of pixels or the corresponding lines of pixels.

In a related example of the first or third embodiment, the first filter decision value is calculated as $\overline{\omega}_i|p2_i-2p1_i+p0_i|+\overline{\omega}_j|p2_j-2p1_j+p0_j|$ and the second filter decision value is calculated as $\overline{\omega}_i|q2_i-2q1_i+q0_i|+\overline{\omega}_j|q2_j-2q1_j+q0_j|$. $\overline{\omega}_i,\overline{\omega}_j$ represent different line-specific weights. This concept can also be extended to the case with more than two lines of pixels and two corresponding lines of pixels. In a particular example, a line of pixels or corresponding line of pixels that is closer to the middle of the block or the neighboring block could then be assigned a comparatively higher weight as compared to a line or pixels or corresponding line of pixels that is closer to one of the edges of the block or the neighboring block.

In a fourth embodiment, a combination of block-specific and line-specific filter decision values is used to determine how many pixels to filter for the lines of pixels in the block and the corresponding lines of pixels in the neighboring block. FIG. 3 schematically illustrates such an embodiment. The method starts in step S10 where a third filter decision value is calculated as $|p2_2-2p1_2+p0_2|+|p2_5-2p1_5+p0_5|$, wherein $p0_2$ denotes the pixel value of the pixel closest to, in a second line of pixels in the block 10, the block boundary 1, $p1_2$ denotes the pixel value of the pixel next closest to, in the second line of pixels, the block boundary 1, $p2_2$ denotes the pixel value of the pixel second next closest to, in the second line of pixels, the block boundary 1, $p0_5$ denotes a pixel value of a pixel closest to, in a third line of pixels in the block 10, the block boundary 1, $p1_5$ denotes a pixel value of a pixel next closest to, in the third line of pixels, the block boundary 1 and $p2_5$ denotes a pixel value of a pixel second next closest to, in the third line of pixels, the block boundary 1. The second line of pixels preferably corresponds to line number 2 in the block 10 and the third line of pixel preferably corresponds to line number 5 in the block 10, see FIGS. 2A and 2B.

The next step S11 calculates a fourth filter decision value as $|q2_2-2q1_2+q0_2|+|q2_5-2q1_5+q0_5|$, wherein $q0_2$ denotes the pixel value of the pixel in the neighboring block 20 closest to, in a corresponding second line of pixels in the neighboring block 20, the block boundary 1, $q1_2$ denotes the pixel value of the pixel of the neighboring block 20 next closest to, in the corresponding second line of pixels, the block boundary 1, $q2_2$ denotes the pixel value of the pixel in the neighboring block 20 second next closest to, in the corresponding second line of pixels, the block boundary 1, $q0_5$ denotes a pixel value of a pixel in the neighboring block 20 closest to, in a corresponding third line of pixels in the neighboring block 20, the block boundary 1, $q1_5$ denotes a pixel value of a pixel of the neighboring block 20 next closest to, in the corresponding third line of pixels, the block boundary 20 and $q2_5$ denotes a pixel value of a pixel in the neighboring block 20 second next closest to, in the corresponding third line of pixels, the block boundary 1. The second corresponding line of pixels preferably corresponds to line number 2 in the neighboring block 20 and the third corresponding line of pixel preferably corresponds to line number 5 in the neighboring block 20, see FIGS. 2A and 2B.

Steps S10 and S11 can be performed serially in any order or at least partly in parallel.

The next step S12 compares the third filter decision value calculated in step S10 with a third threshold value ($T_3$). If the third filter decision value is below the third threshold value the method continues to steps S1 and then S3 of FIG. 1. Thus, in such a case a respective line-specific or first filter decision value is calculated for each line i in the block 10, where i preferably is from 0 to 7. This first filter decision value is then calculated as $|p2_i-2p1_i+p0_i|$, in step S1 of FIG. 1. Step S3 of FIG. 1 determines how many pixels in the line i of pixels in the block 10 to filter relative to the block boundary 1 based on the first filter decision value calculated for the line i of pixels in step S1. This procedure is performed for each line of pixels in the block 10. Thus, with a block 10 as illustrated in FIG. 2A or 2B steps S1 and S3 will be performed eight times. The method then continues to step S13 of FIG. 3. Correspondingly, if the third filter decision value is not below the first threshold value in step S12 the method continues to step S13.

Step S13 compares the fourth filter decision value calculated in step S11 with a fourth threshold value ($T_4$). If the fourth filter decision value is below the fourth threshold the method continues to steps S2 and S4 of FIG. 1. A respective line-specific or second filter decision value is calculated for each corresponding line i in the neighboring block 20 as $|q2_i-2q1_i+q0_i|$ in step S2 of FIG. 1. Step S4 of FIG. 3 determines how many pixels in the corresponding line i of pixels in the neighboring block 20 to filter relative to the block boundary 1 based on the second filter decision value calculated for the corresponding line i of pixels in step S2. This procedure is performed for each corresponding line of pixels in the neighboring block 20. The method then ends. Correspondingly, if the fourth filter decision value is not below the second threshold value in step S13 the method ends.

The loop formed by steps S12, S1 and S3 can be performed sequentially in any order relative to the loop formed by steps S13, S2 and S4 or at least partly in parallel. In an example of this fourth embodiment a combination of block-based and line-based asymmetric filter decisions is used. In this example the third filter decision value is calculated as $d_p=|p2_2-2p1_2+p0_2|+|p2_5-2p1_5+p0_5|$ and the fourth filter decision value is calculated as $d_q=q2_2-2q1_2+q0_2|+|q2_5-2q1_5+q0_5$. The line-specific filter decision values, i.e. the first and second filter decision values, are calculated as $d_{pi}=|p2_i-2p1_i+p0_i|$ and $d_{qi}=|q2_i-2q1_i+q0_i|$ for line and corresponding line number i, respectively.

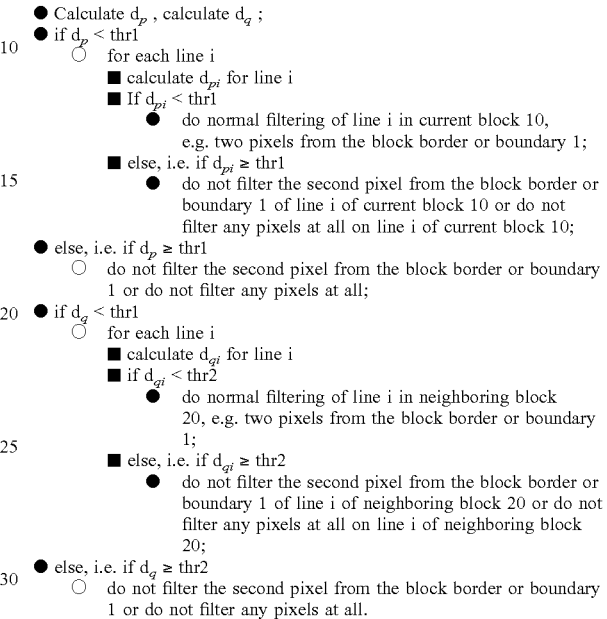

In the above disclosed example the same threshold value has been used when comparing the third filter decision value and the first filter decision values, i.e. thr1, and the same threshold value has been used when comparing the fourth filter decision value and the second filter decision values, i.e. thr2. In an alternative approach, a third threshold value is used for the third filter decision value, a first threshold value is used for the first filter decision values, a fourth threshold value is used for the fourth filter decision value and a second threshold value is used for the second threshold values. In a particular embodiment, the third and fourth threshold values are equal and the first and second threshold values are equal.

FIG. 4 is a flow diagram illustrating a particular embodiment of the determining steps S3 and S4 of FIG. 1. The method continues from step S2 in FIG. 1. A next step S20 compares the first filter decision value ($d_p$) calculated in step S1 in FIG. 1 to a first threshold value ($T_1$). If the first filter decision value is below the first threshold value the method continues from step S20 to step S21. Step S21 determines to filter two pixels in the line 12 of pixels 11, 13, 15, 17 in the block 10 relative to the block boundary 1. These two pixels are preferably the pixel 11 closest to the block boundary 1 and the pixel 13 next closest to the block boundary 1 in the line 12 of pixels 11, 13, 15, 17. However, if the first filter decision value is not below the first threshold in step S20 the method instead continues to step S22. A first embodiment of step S22 determines to filter one pixel in the line 12 of pixels 11, 13, 15, 17 in the block 10 relative to the block boundary 1. This pixel 11 is preferably the pixel 11 closest to the block boundary 1 in the line 12 of pixels 11, 13, 15, 17. A second embodiment of step S22 determines to filter no pixels in the line 12 of pixels 11, 13, 15, 17 in the block 10 relative to the block boundary 1.

Steps S23 to S25 perform the corresponding determination for the corresponding line 22 of pixels 21, 23, 25, 27 in the neighboring block 20. Thus, step S23 compares the second filter decision value ($d_q$) calculated in step S2 in FIG. 1 with a second threshold value ($T_2$). If the second filter decision value is below the second threshold value the method continues to step S24. Step S24 determines to filter two pixels in the corresponding line 22 of pixels 21, 23, 25, 27 in the neighboring block 20 relative to the block boundary 1. These two pixels 21, 23 are preferably the pixel 21 closest to the block boundary 1 and the pixel 23 next closest to the block boundary 1 in the corresponding line 22 of pixels 21, 23, 25, 27. If the second filter decision value is not below the second threshold the method instead continues to step S25 from step S23. A first embodiment of step S25 determines to filter one pixel in the corresponding line 22 of pixels 21, 23, 25, 27 in the neighboring block 20 relative to the block boundary 1. This pixel 21 is preferably the pixel 21 closest to the block boundary 1 in the corresponding line 22 of pixels 21, 23, 25, 27. A second embodiment of step S25 determines to filter no pixels in the corresponding line 22 of pixels 21, 23, 25, 27 in the neighboring block relative to the block boundary 1.

Steps S20, S21 and S22 can be performed prior to, following or at least in parallel to steps S23, S24 and S25.

This concept can be extended by using more than one threshold value per filter decision value. For instance, if $d_p<T_1$ two pixels are filtered in the line 12 of pixels 11, 13, 15, 17, if $T_1 \le d_p < T_1'$ one pixel is filtered in the line 12 of pixels 11, 13, 15, 17 and if $d_p T_1'$ no pixels are filtered in the line 12 of pixels 11, 13, 15, 17. In this case $T_1<T_1'$. Correspondingly, if $d_q<T_2$ two pixels are filtered in the corresponding line 22 of pixels 21, 23, 25, 27, if $T_2 \le d_q < T_2'$ one pixel is filtered in the corresponding line 22 of pixels 21, 23, 25, 27 and if $d_q \ge T_2'$ no pixels are filtered in the corresponding line 22 of pixels 21, 23, 25, 27. In this case $T_2<T_2'$.

Thus, in a general aspect the closer the first or second filter decision value is to zero the more filtering is to be applied to the particular line or corresponding line of pixels by filtering and possibly modifying more pixels in the line or corresponding line of pixels as compared to a larger first or second filter decision value. This means that a zero or low first or second filter decision value implies no or few structures but rather a fairly uniform area in the video frame. Correspondingly, a high first or second filter decision value generally reflects local structures in the area in the video frame, which local structures should not be repressed or filtered away.

This embodiment decreases the computational complexity in connection with deblocking filtering since the filtering of the second pixel from the block border may happen less frequently as compared to the prior art HEVC solution.

Figure 5:
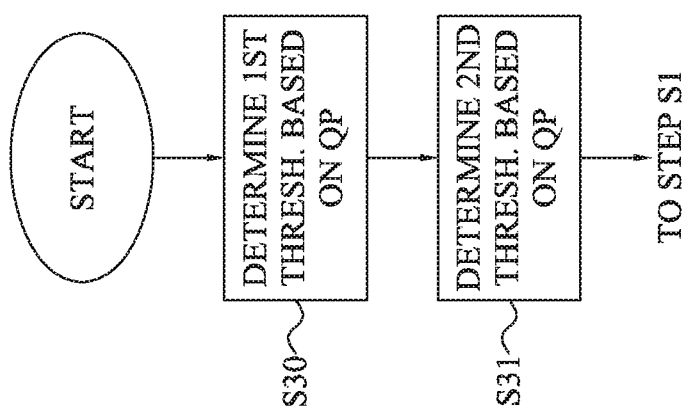
FIG. 5 is a flow diagram illustrating additional, optional steps of the method in FIG. 1 according to another embodiment.

The threshold values discussed in the foregoing and used to compare the different filter decision values are preferably dependent on the quantization parameter (QP) assigned to the block or to the neighboring block. FIG. 5 schematically illustrates such an approach. The method starts in step S30 where the first threshold value, to which the first filter decision value is compared (see step S20 in FIG. 4), is determined based on a quantization parameter associated with the block 10. Correspondingly, step S31 determines the second threshold value, to which the second threshold value is compared (see step S23 in FIG. 4), based on a quantization parameter associated with the neighboring block 20 and/or a quantization parameter associated with the block 10.

For instance, $T_1$ and $T_2$ are determined based on the parameter B, which is determined from the QP value of the block 10 or the neighboring block 20. In a particular embodiment, the parameter 3 is read from a table based on the QP value, see Table 1 below.

TABLE 1

| β and QP values | | | | | | | | | | | | | | | | | | | |
|---|---|---|---|---|---|---|---|---|---|---|---|---|---|---|---|---|---|---|---|
| QP | 0 | 1 | 2 | 3 | 4 | 5 | 6 | 7 | 8 | 9 | 10 | 11 | 12 | 13 | 14 | 15 | 16 | 17 | 18 |
| β | 0 | 0 | 0 | 0 | 0 | 0 | 0 | 0 | 0 | 0 | 0 | 0 | 0 | 0 | 0 | 0 | 6 | 7 | 8 |
| QP | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| QP | 38 | 39 | 40 | 41 | 42 | 43 | 44 | 45 | 46 | 47 | 48 | 49 | 50 | 51 | 52 | 53 | 54 | 55 | |
| β | 38 | 40 | 42 | 44 | 46 | 48 | 50 | 52 | 54 | 56 | 58 | 60 | 62 | 64 | 64 | 64 | 64 | 64 | |

In particular embodiments $T_1=T_2=\beta/6$ or $T_1=T_2=(\beta+\beta>>1)>>3$. As another variant of the embodiment, the thresholds can be read from separate tables, i.e. $T_1$=function(QP), $T_2$=function(QP). Also the above mentioned third and fourth threshold values are preferably determined based on the quantization parameter associated with the block and the neighboring block, respectively.

Figure 6:
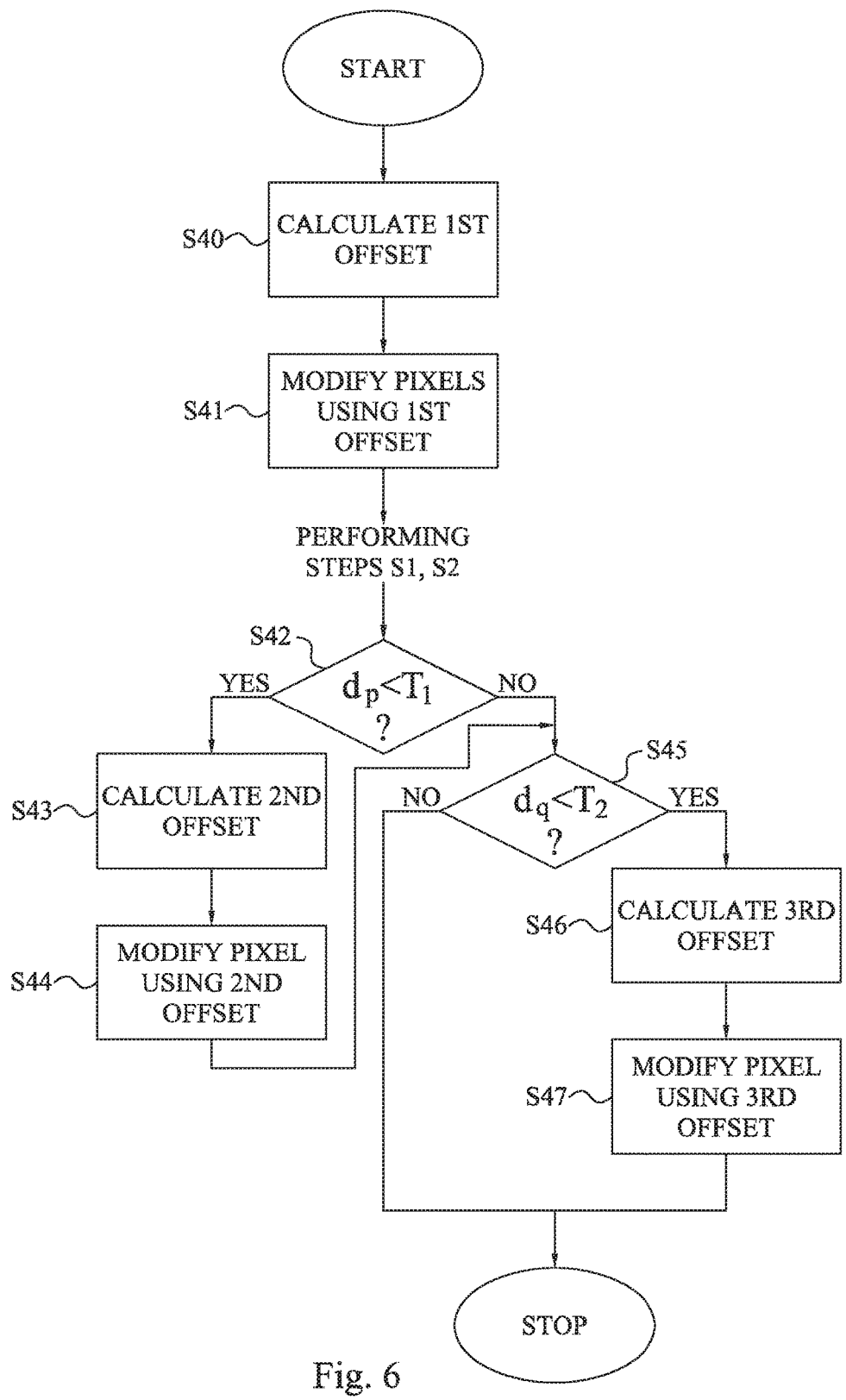
FIG. 6 is a flow diagram illustrating additional, optional steps of the method in FIG. 1 and an embodiment of the determining steps in FIG. 1.

FIG. 6 is a flow diagram illustrating how the filtering control of the embodiments can be used in connection with a filtering process. The method starts in step S40 where a first offset or delta value Δ is calculated based on $$\frac{9 \times (q0_j - p0_j) - 3 \times (q1_j - p1_j)}{16},$$

wherein $p0_j$ denotes a pixel value of a pixel 11 closest to, in a line 12 of pixels 11, 13, 15, 17, the block boundary 1, $p1_j$ denotes a pixel value of a pixel 13 next closest to, in the line 12 of pixels 11, 13, 15, 1), the block boundary 1, $q0_j$ denotes a pixel value of a pixel 21 in the neighboring block 20 closest to, in the corresponding line 22 of pixels 21, 23, 25, 27, the block boundary 1 and $q1_j$ denotes a pixel value of a pixel 23 of the neighboring block 20 next closest to, in the corresponding line 22 of pixels 21, 23, 25, 27, the block boundary 1.

This first offset is used in step S41 to modify the pixel value of the pixel 11 closest to the block boundary 1 in the line 12 of pixels 11, 13, 15, 17 by adding the first offset to the pixel value, i.e. $p0_j'=p0_j+\Delta$. Step S41 also modifies the pixel value of the pixel 21 closest to the block boundary 1 in the corresponding line 22 of pixels 21, 23, 25, 27 by subtracting the first offset from the pixel value, i.e. $q0_j'=q0_j-\Delta$. The method then continues to steps S1 and S2 of FIG. 1 where the first ($d_p$) and second ($d_q$) filter decision values are calculated. A next step S42 compares the first filter decision value to a first threshold value ($T_1$). This step S42 corresponds to step S20 in FIG. 4. If the first filter decision value is below the threshold the method continues to step S43.

Step S43 calculates a second offset or delta value $\Delta_p$ based on $$\frac{p0_j + p2_j - 2p1_j + 2\Delta}{4},$$

wherein $p2_j$ denotes a pixel value of a pixel 15 second next closest to, in the line 12 of pixels 11, 13, 15, 17, the block boundary 1. The second offset is then used in step S44 to modify the pixel value of the pixel 13 next closest to the block boundary 1 in the line 12 of pixels 11, 13, 15, 17 by adding the second offset to the pixel value, i.e. $p1_j'=p1_j+\Delta_p$.

The method then continues to step S45. The method also continues in FIG. 6 from step S42 to step S45 if the first threshold value is not below the first threshold.

Step S45 compares the second filter decision value with a second threshold ($T_2$). This step S45 corresponds to step S23 of FIG. 4. If the second filter decision value is below the second threshold the method continues to step S46. Step S46 calculates a third offset $\Delta_q$ based on $$\frac{q0_j + q2_j - 2q1_j - 2\Delta}{4},$$

wherein $q2_j$ denotes a pixel value of a pixel 25 in the neighboring block 20 second next closest to, in the corresponding line 22 of pixels 21, 23, 25, 27, the block boundary 1. The third offset is used in step S47 to modify the pixel value of the pixel 23 next closest to the block boundary 1 in the corresponding line 22 of pixels 21, 23, 25, 27 by adding the third offset to the pixel value, i.e. $q1_j'=q1_j+\Delta_q$.

Steps S42, S43 and S44 can be performed serially in any order or at least partly in parallel with steps S45, S46 and S47.

In above, the first, second and third offsets are calculated based on particular equations of pixel values. This means that the first offset is calculated as a function of $$\frac{9\times(q0_j - p0_j) - 3\times(q1_j - p1_j)}{16},$$

the second offset is calculated as a function of $$\frac{p0_j + p2_j - 2p1_j + 2\Delta}{4}$$

and the third offset is calculated as a function of $$\frac{q0_j + q2_j - 2q1_j - 2\Delta}{4}.$$

Different such functions are possible and can be used in steps S40, S43 and S46. Such functions could then be defined so that the calculations of the offsets are efficiently performed in hardware. In such a case, it is generally preferred not to have any divisions and/or define the functions so that the offsets will be an integer value. In an embodiment, (X+8)>>4 is used as an integer-expression of X/16, where >> denotes a right shift operation. Thus, in a particular embodiment step S40 calculates the first offset to be based on and preferably equal to $(9\times(q0_j-p0_j)-3\times(q1_j-p1_j)+8)>>4$. Corresponding integer representations of the second and third offsets could be $(((p0_j+p2_j+1)>>1)-p1_j+\Delta)>>1$ and $(((q0_j+q2_j+1)>>1)-q1_j-\Delta)>>1$.

In an example the modified pixel values as a result of deblocking are calculated like in the following. In this example, the first filter decision value is defined as $d_p=|p2_2-2p1_2+p0_2|+|p2_5-2p1_5+p0_5|$ and the second filter decision value is calculated as $d_q=|q2_2-2q1_2+q0_2|+|q2_5-2q1_5+q0_5|$.

- $\Delta = \dfrac{9\times(q0-p0)-3\times(q1-p1)}{16}$
- $p_0' = p_0 + \Delta$
- $q_0' = q_0 - \Delta$
- if $d_p < thrP$
  - $\Delta_p = \dfrac{p0+p2-2p1_j+2\Delta}{4}$
  - $p_1' = p_1 + \Delta_p$
- if $d_q < thrQ$
  - $\Delta_q = \dfrac{q0+q2-2q1-2\Delta}{4}$
  - $q_1' = q_1 + \Delta_q$ Exact formulas for computation of the example above in the programming language can look like in the text below. Here, the Clip3 function is clipping of the output values to the range between the two first function arguments.

```
Int xCalcDP(Pel* piSrc, Int iOffset)
{
    return abs(piSrc[-iOffset*3]-2*piSrc[-iOffset*2]+piSrc[-iOffset]);
}
Int xCalcDQ(Pel* piSrc, Int iOffset)
{
    return abs(piSrc[0]-2*piSrc[iOffset]+piSrc[iOffset*2]);
}
Int iDP=xCalcDP(piTmpSrc+iSrcStep*(iIdx*uiPelsInPart+iBlkIdx*
DEBLOCK_SMALLEST_BLOCK+2),iOffset)+xCalcDP(piTmpSrc+iSrcStep*
(iIdx*uiPelsInPart+iBlkId*DEBLOCK_SMALLEST_BLOCK+5),iOffset);
Int iDQ=xCalcDQ(piTmpSrc+iSrcStep*(iIdx*uiPelsInPart+iBlkIdx*
DEBLOCK_SMALLEST_BLOCK+2),iOffset)+xCalcDQ(piTmpSrc+iSrcStep*(Idx*uiPelsInPart+iB
lkIdx*DEBLOCK_SMALLEST_BLOCK+5),iOffset);
Int iSideThreshold=iBeta/6;
Bool bFilterP=(iDP<iSideThreshold);
Bool bFilterQ=(iDQ<iSideThreshold);
delta=(9*(m4-m3)-3*(m5-m2)+8)>>4;
if (abs(delta)<iThrCut)
```

```
{
    Int tc2=tc>>1;
    delta=Clip3(-tc, tc, delta);
    piSrc[-iOffset]=Clip((m3+delta));
    piSrc[0]=Clip((m4-delta));
    if(bFilterP)
    {
        Int delta1=Clip3(-tc2,tc2,((((m1+m3+1)>>1)-m2+delta)>>1));
        piSrc[-iOffset*2]=Clip((m2+delta1));
    }
    if(bFilterQ)
    {
        Int delta2=Clip3(-tc2,tc2,((((m6+m4+1)>>1)-m5-delta)>>1));
        piSrc[iOffset]=Clip((m5+delta2));
    }
}
```

Figure 7:
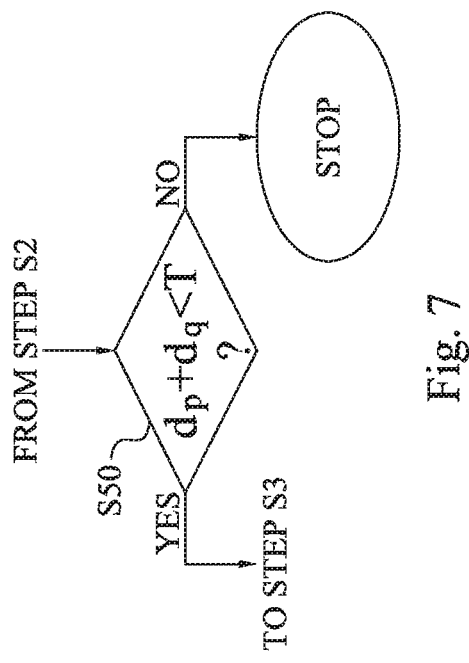
FIG. 7 is a flow diagram illustrating an additional, optional step of the method in FIG. 1 according to an embodiment.

FIG. 7 is a flow diagram illustrating additional optional steps of the method in FIG. 1. The method continues from step S2 in FIG. 1. A next step S50 compares a sum of the first decision value and the second decision value with a threshold value (T). If the sum is not below the threshold value, the method ends. Thus, in such a case no filtering at all is applied to block 10 and neighboring block 20 with regard to the particular block boundary 1. The block 10 and the neighboring block 20 then comprises at lot of local structures, which should not be filtered away. However, if the sum is below the threshold value the method continues to steps S3 and S4 in FIG. 1, where the determination of how many pixels to filter is performed based on the first filter decision value (step S3) or the second filter decision value (step S4).

This embodiment has an advantage that it does not require many additional computations as the values for the first and second filter decisions are also used for deciding whether to filter the block boundary at all.

The embodiments disclosed herein achieve asymmetric deblocking decisions that control deblocking filtering to be adaptive to the structure on each side of a block boundary. The asymmetric decisions means that the amount of filtering applied to one side of the block boundary can differ from the amount of filtering applied to the other side of the block boundary, thus providing additional adaptation to the local structure. This improves the objective and subjective video quality.

Figure 8:
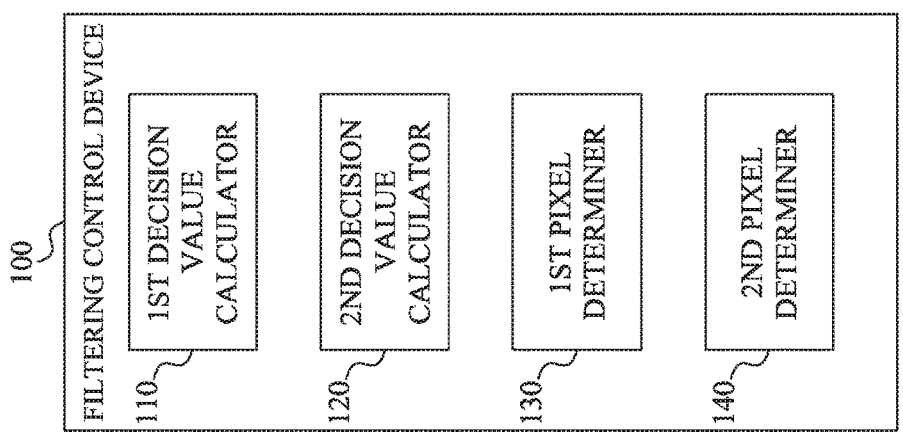
FIG. 8 is a schematic block diagram of an embodiment of a filtering control device.

FIG. 8 is a schematic block diagram of an embodiment of a filtering control device 100. The filtering control device 100 comprises a first decision value calculator 110 configured to calculate a first filter decision value for a block 10 in a video frame based at least on $|p2_i-2p1_i+p0_i|$. The filtering control device 100 also comprises a second decision value calculator 120 configured to calculate a second, different filter decision value for the block 10 based on $|q2_i-2q1_i+q0_i|$.

A first pixel determiner 130 or first pixel determining unit or processor is configured to determine how many pixels in a line 12 of pixels 11, 13, 15, 17 in the block 10 to filter relative to a block boundary 1 based on the first filter decision value calculated by the first decision value calculator 110. A second pixel determiner 140 or second pixel determining unit or processor is provided in the filtering control device 100 to determine how many pixels in a corresponding line 22 of pixel 21, 23, 25, 27 in a neighboring block 20 of the video frame to filter relative to the block boundary based on the second filter decision value calculated by the second decision value calculator 120.

In an embodiment, the first pixel determiner 130 is configured to determine how many pixels in the first line 12 of pixels 11, 13, 15, 17 in the block 10 to filter relative to the block boundary 1 based on the first filter decision value calculated by the first decision value calculator 110 for the first line 12 of pixels 11, 13, 15, 17. The second pixel determiner 140 correspondingly determines in this embodiment how many pixels in the corresponding first line 22 of pixels 21, 23, 25, 27 in the neighboring block 20 to filter relative to the block boundary 1 based on the second filter decision value calculated by the second decision value calculator 120 for the corresponding first line 22 of pixels 21, 23, 25, 27.

In another embodiment, the first decision value calculator 110 is configured to calculate the first filter decision value as $|p2_2-2p1_2+p0_2|+|p2_5-2p1_5+p0_5|$ and the second decision value calculator 120 is configured to calculate the second filter decision value as $|q2_2-2q1_2+q0_2|+|q2_5-2q1_5+q0_5|$.

In yet another embodiment, the first decision value calculator 110 is configured to calculate the first filter decision value of a first pair as $|p2_0-2p1_0+p0_0|+|p2_3-2p1_3+p0_3|$ and the second decision value calculator 120 is configured to calculate the second filter decision value of the first pair as $|q2_0-2q1_0+q0_0|+|q2_3-2q1_3+q0_3|$. The first filter decision value calculator 110 is also configured to calculate the first filter decision value of a second pair as $|p2_4-2p1_4+p0_4|+|p2_7-2p1_7+p0_7|$ and the second filter decision value calculator 120 is also configured to calculate the second filter decision value of a the second pair as $|q2_4-2q1_4+q0_4|+|q2_7-2q1_7+q0_7|$.

Figure 9:
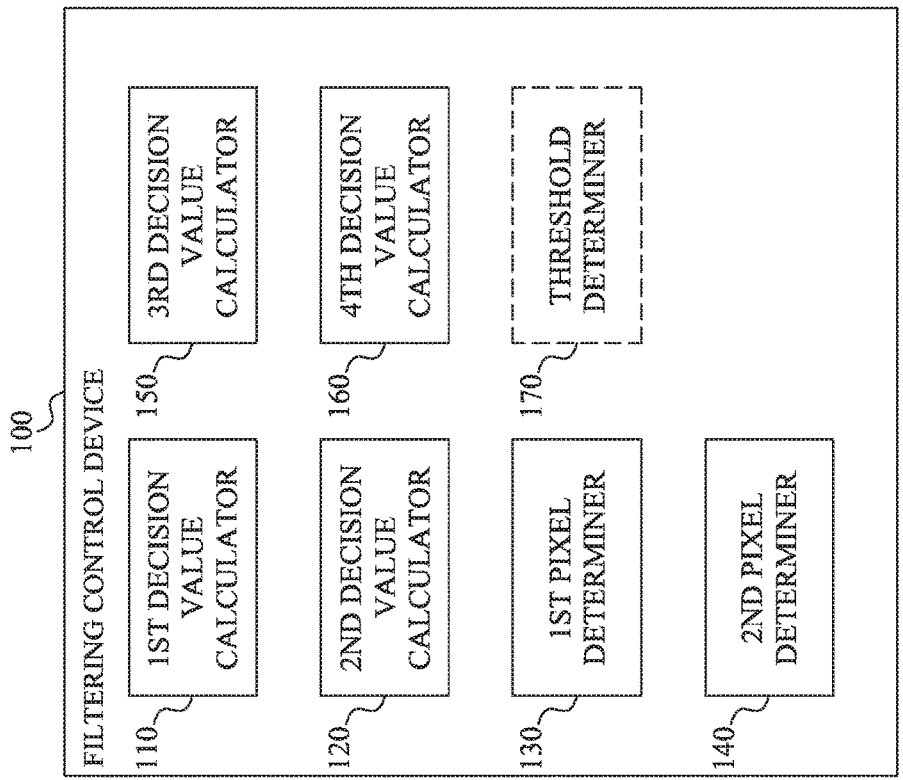
FIG. 9 is a schematic block diagram of another embodiment of a filtering control device.

FIG. 9 is a schematic block diagram of another embodiment of a filtering control device 100. The filtering control device 100 comprises, in this embodiment and in addition to the first decision value calculator 110, the second decision value calculator 120, the first pixel determiner 130 and the second pixel determiner 140, a third decision value calculator 150. The third decision value calculator 150 is then configured to calculate a third filter decision value as $|p2_2-2p1_2+p0_2|+|p2_5-2p1_5+p0_5|$. A fourth decision value calculator 160 is also implemented in the filtering control device 100 and configured to calculate a fourth filter decision value as $|q2_2-2q1_2+q0_2|+|2_5-2q1_5+q0_5|$.

In this embodiment, the first filter decision value calculator 110 is configured to calculate the first filter decision value if the third filter decision value calculated by the third decision value calculator 150 is below a third threshold value. If the third decision value is below the third threshold, the first decision value calculator 110 calculates a first threshold value for each line i 12 of pixels 11, 13, 15, 17 in the block 10 as $|p2_i-2p1_i+p0_i|$. The first pixel determiner 130 then determines, if the third filter decision value is below the third threshold value and for each line i 12 of pixels 11, 13, 15, 17 in the block 10, how many pixels in the line i 12 of pixels 11, 13, 15, 17 in the block 10 to filter relative to the block boundary 1 based on the first filter decision value calculated by the first decision value calculator 110 for the line i 12 of pixels 11, 13, 15, 17.

The second decision value calculator 120 is preferably responsive to a comparison between the fourth filter decision value and a fourth threshold value. Thus, if the fourth filter decision value calculated by the fourth decision value calculator 160 is below the fourth threshold the second decision value calculator 120 calculates a second filter decision value as $|q2_i-2q1_i+q0_i|$ for each corresponding line i 22 of pixels 21, 23, 25, 27 in the neighboring block 20. The second pixel determiner 240 is configured to determine, if the fourth filter decision value is below the fourth threshold value and for each corresponding line i 22 of pixels 21, 23, 25, 27 in the neighboring block 20, how many pixels in the corresponding line i 22 of pixels 21, 23, 25, 27 in the neighboring block 20 to filter relative to the block boundary 1 based on the second filter decision value calculated for the corresponding line i 22 of pixels 21, 23, 25, 27.

Figure 10:
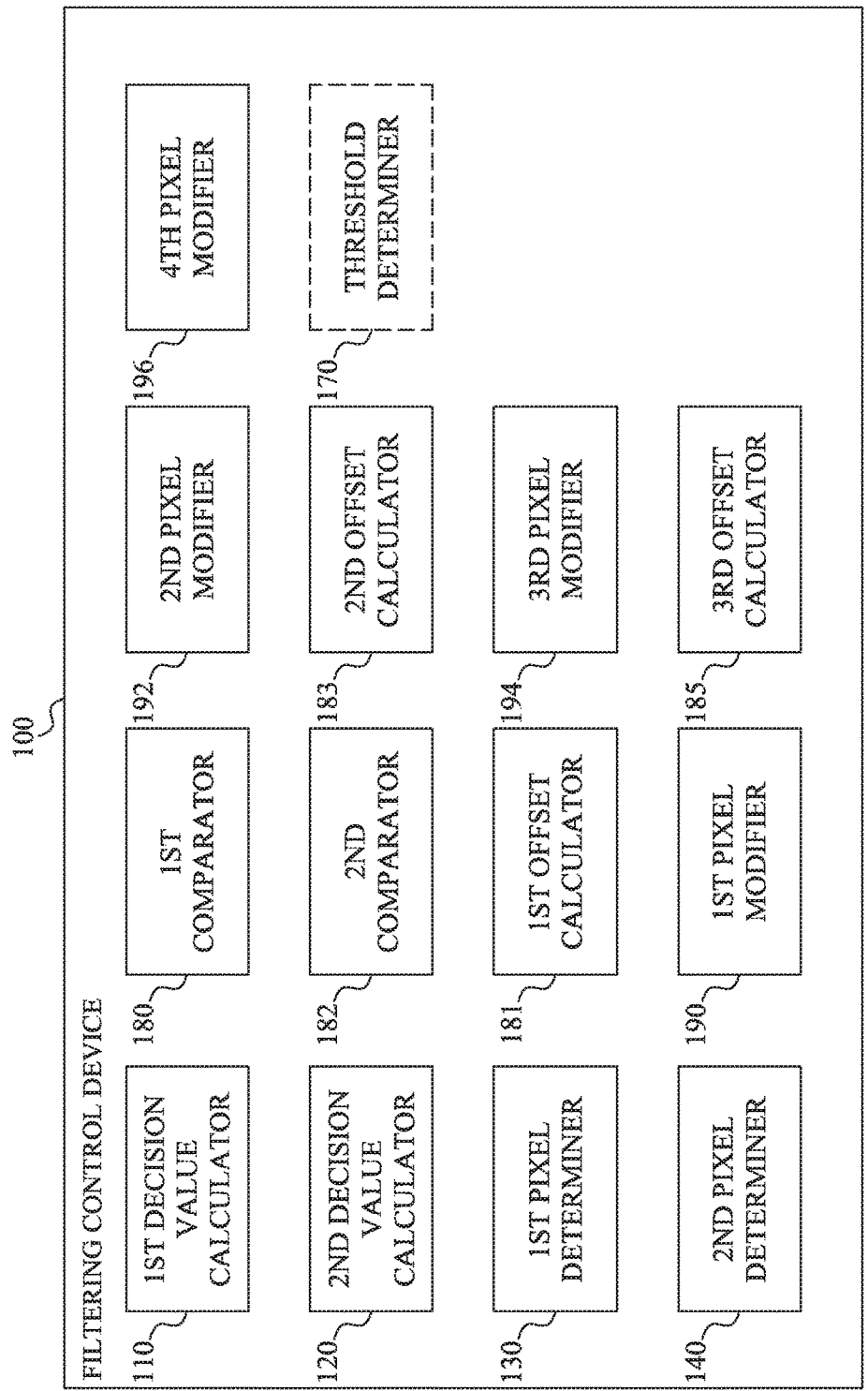
FIG. 10 is a schematic block diagram of a further embodiment of a filtering control device.

FIG. 10 is a schematic block diagram of a further embodiment of a filtering control device 100. In addition to the units 110-140 of the embodiment illustrated in FIG. 8, the filtering control device 100 comprises a first comparator 180 configured to compare the first filter decision value calculated by the first decision value calculator 110 to a first threshold value. A second comparator 182 is correspondingly configured to compare the second filter decision value calculated by the second decision value calculator 120 to a second threshold value.

In this embodiment, the first pixel determiner 130 is configured to determine to filter two pixels in the line 12 of pixels 11, 13, 15, 17 in the block 10 relative to the block boundary 1 if the first filter decision value is below the first threshold value as determined by the first comparator 180. However, if the first filter decision value is not below the first threshold value the first pixel determiner 130 is instead configured to determine to filter one pixel in the line 12 of pixels 11, 13, 15, 17 in the block 10 relative to the block boundary 1. Alternatively, the first pixel determiner 130 is instead configured to determine to filter no pixels in the line 12 of pixels 11, 13, 15, 17 in the block 10 relative to the block boundary 1.

The second pixel determiner 140 is configured to determine to filter two pixels in the corresponding line 22 of pixels 21, 23, 25, 27 in the neighboring block 20 relative to the block boundary 1 if the second filter decision value is below the second threshold value as determined by the second comparator 182. However, if the second filter decision value is not below the second threshold the second pixel determiner 140 is instead configured to determine to filter one pixel in the corresponding line 22 of pixels 21, 23, 25, 27 in the neighboring block 20 relative to the block boundary 1. Alternatively, the second pixel determiner 140 is instead configured to determine to filter no pixels in the corresponding line 22 of pixels 21, 23, 25, 27 in the neighboring block 20 relative to the block boundary 1.

In an embodiment the filtering control device 100 of FIG. 10 comprises a first offset calculator 181 configured to calculate a first offset based on $$\frac{9 \times (q0_j - p0_j) - 3 \times (q1_j - p1_j)}{16}.$$

A first pixel modifier 190 of the filtering control device 100 is configured to modify the pixel value of the pixel 11 closest to the block boundary 1 in the line 12 of pixels 11, 13, 15, 17 by adding the first offset to the pixel value of this pixel 11. A second pixel value modifier 192 is configured to modify the pixel value of the pixel 21 closest to the block boundary 1 in the corresponding line 12 of pixels 21, 23, 25, 27 by subtracting the first offset from the pixel value of this pixel 21.

A second offset calculator 183 is preferably implemented in the filtering control device 100 to calculate a second offset if the first filter decision value is below the first threshold value as determined by the first comparator 180. The second offset is then calculated based on $$\frac{p0_j + p2_j - 2p1_j + 2\Delta}{4}.$$

A third pixel modifier 194 is operated if the first filter decision value is below the first threshold value. In such a case, the third pixel modifier 194 is configured to modify the pixel value of the pixel 13 next closest to the block boundary 1 in the line 12 of pixels 11, 13, 15, 17 by adding the second offset to the pixel value of this pixel 13.

A third offset calculator 185 is configured to calculate a third offset based on $$\frac{q0_j + q2_j - 2q1_j - 2\Delta}{4}$$

if the second filter decision value is below the second threshold value as determined by the second comparator 182. If the second filter decision value is below the second threshold value a fourth pixel modifier 196 of the filtering control device 100 is configured to modify the pixel value of the pixel 23 next closest to the block boundary 1 in the corresponding line 22 of pixels 21, 23, 25, 27 by adding the third offset to the pixel value of this pixel 23.

The embodiments of the filtering control device 100 discussed in the foregoing in connection with FIGS. 9 and 10 compares filter decision values to respective threshold values. In an embodiment, such threshold values are calculated by the filtering control device 100 for the particular block boundary 1. The filtering control device 100 then preferably comprises a threshold determiner 170 or threshold determining processor or unit configured to determine the first threshold value used by the first comparator 180 in FIG. 10 and the third threshold value used by the filtering control device 100 in FIG. 9 based on a quantization parameter associated with the block 10. Correspondingly, the threshold determiner 170 correspondingly preferably determines the second threshold value used by the second comparator 182 in FIG. 10 and the fourth threshold value used by the filtering control device 100 in FIG. 9 based on a quantization parameter associated with the neighboring block 20.

Figure 11:
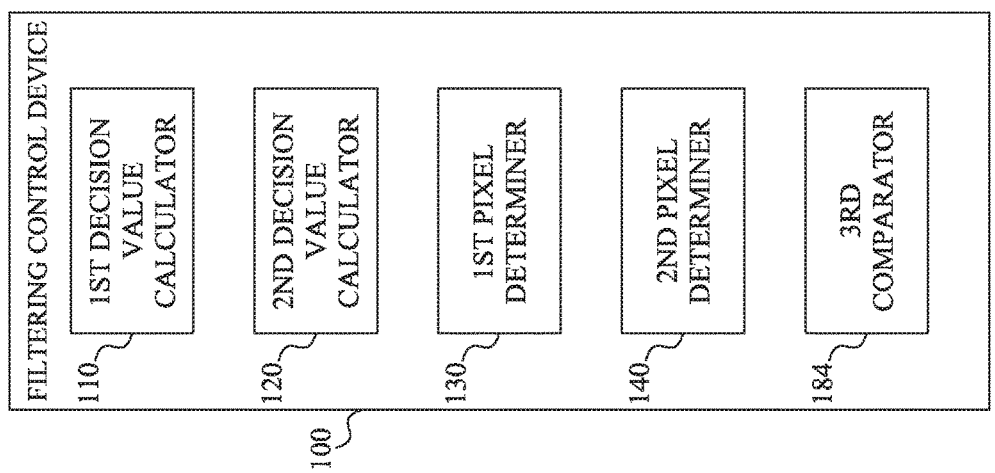
FIG. 11 is a schematic block diagram of yet another embodiment of a filtering control device.

FIG. 11 is schematic block diagram of yet another embodiment of a filtering control device 100. In addition to the units 110-140 of the embodiment illustrated in FIG. 8, the filtering control device 100 comprises in this embodiment a third comparator 184 configured to compare a sum of the first filter decision value and the second filter decision value to a threshold value. If the sum is equal to or exceeds the threshold value the first and second pixel determiners 130, 140 will not determine any number of pixels to filter since no filtering is to be applied to the block 10 and the neighboring block 20 with regard to the particular block boundary 1. However, if the sum is below the threshold, the first and second pixel determiners 130, 140 are operated to determine the number of pixels to filter based on the first or second filter decision values, respectively.

The embodiments of the filtering control device 100 discussed in the foregoing and disclosed in FIGS. 8-11 can be combined. For instance, the third value calculator 150 and fourth value calculator 160 of FIG. 9 can be implemented in any of the embodiments disclosed in FIG. 10 or 11. Correspondingly, the third comparator 184 of FIG. 11 can be implemented in any of the embodiments disclosed in FIG. 9 or 10.

Although the respective units 110-196 disclosed in conjunction with FIGS. 8-11 have been disclosed as physically separate units 110-196 in the filtering control device 100, and all may be special purpose circuits, such as ASICs (Application Specific Integrated Circuits), alterative embodiments of the filtering control device 100 are possible where some or all of the units 110-196 are implemented as computer program modules running on a general purpose processor. Such an embodiment is disclosed in FIG. 12.

Figure 12:
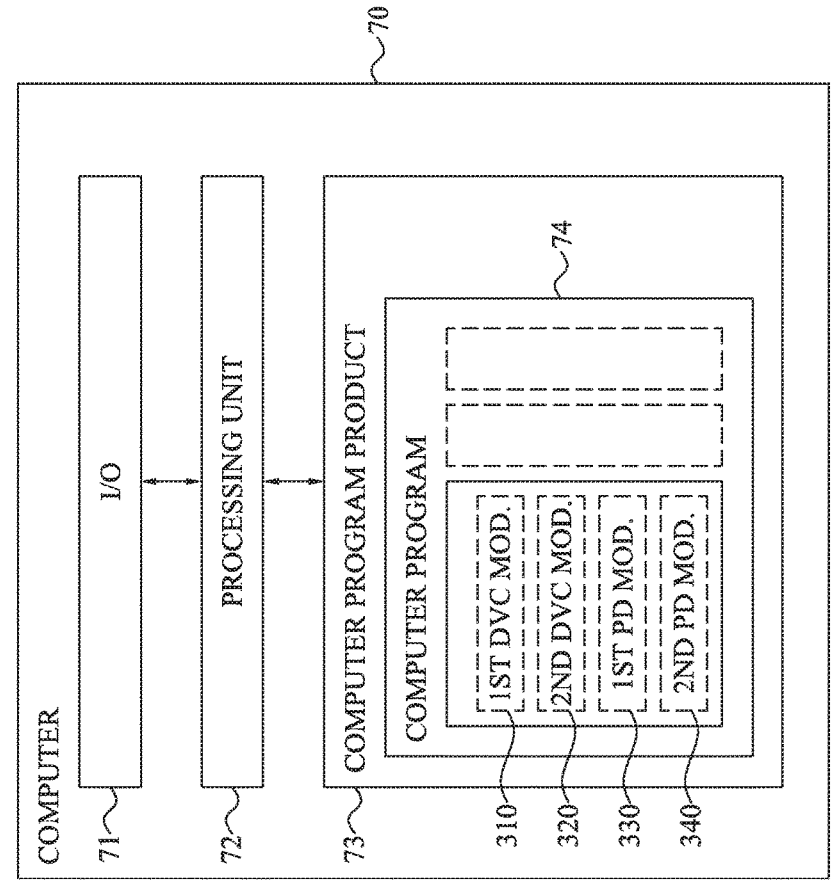
FIG. 12 is a schematic block diagram of a software implementation of a filtering control device in a computer according to an embodiment.

FIG. 12 schematically illustrates an embodiment of a computer 70 having a processing unit 72, such as a DSP (Digital Signal Processor) or CPU (Central Processing Unit). The processing unit 72 can be a single unit or a plurality of units for performing different steps of the method described herein. The computer 70 also comprises an input/output (I/O) unit 71 for receiving recorded or generated video frames or encoded video frames and outputting encoded video frame or decoded video data. The I/O unit 71 has been illustrated as a single unit in FIG. 12 but can likewise be in the form of a separate input unit and a separate output unit.

Furthermore, the computer 70 comprises at least one computer program product 73 in the form of a non-volatile memory, for instance an EEPROM (Electrically Erasable Programmable Read-Only Memory), a flash memory or a disk drive. The computer program product 73 comprises a computer program 74, which comprises code means which when run on or executed by the computer 70, such as by the processing unit 72, causes the computer 70 to perform the steps of the method described in the foregoing in connection with FIG. 1. Hence, in an embodiment the code means in the computer program 74 comprises a first decision value calculating (DVC) module 310 for calculating the first filter decision value for a block, a second pixel value calculating module 320 for calculating the second filter decision value for the block, a first pixel determining (PD) module 330 for determining how many pixels in the line 12 of pixels 11, 13, 15, 17 to filter and a second pixel determining module 340 for determining how many pixels in the corresponding line 22 of pixels 21, 23, 25, 27 to filter. These modules 310-340 essentially perform the steps of the flow diagram in FIG. 1 when run on the processing unit 72. Thus, when the different modules 310-340 are run on the processing unit 72 they correspond to the corresponding units 110-140 of FIGS. 8-11.

The computer program 74 may additionally comprise a third decision value calculating module, a fourth decision value calculating module, a threshold determining module, a first comparing module, second comparing module, a third comparing module, a first offset calculating module, a second offset calculating module, a third offset calculating module, a first pixel modifying module, a second pixel modifying module, a third pixel modifying module and/or a fourth pixel modifying module to perform the operation of the corresponding units 150-196 in FIGS. 9-11.

The computer 70 of FIG. 12 can be a user equipment or be present in a user equipment. In such a case, the user equipment may additionally comprise or be connected to a display to display video data.

The filtering control device of FIGS. 8-11 is preferably used in video coding. It functions and is therefore preferably implemented both in a video encoder and in a video decoder. The video decoder can be implemented preferably in hardware but also in software. The same holds for the video encoder.

Figure 13:
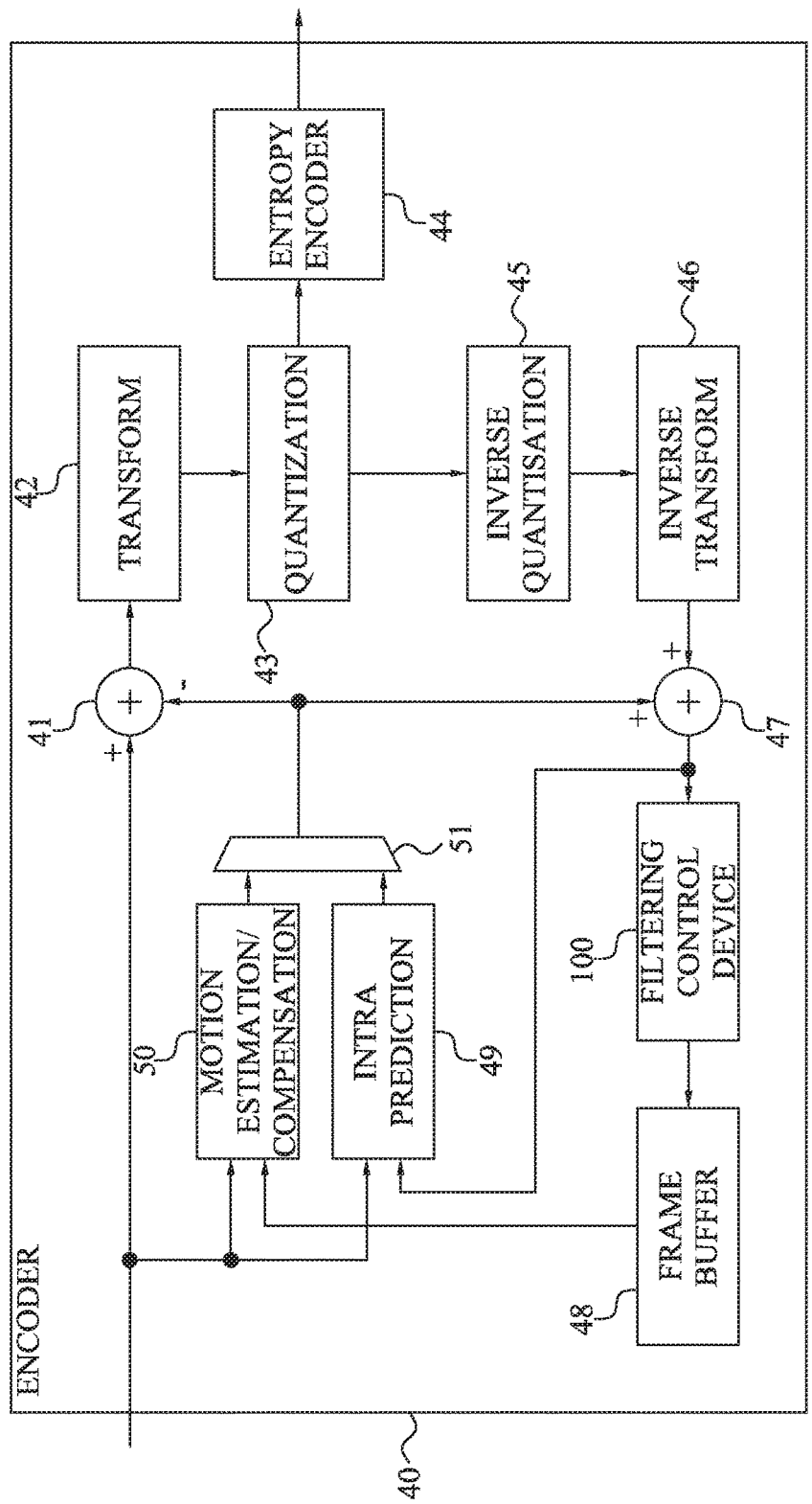
FIG. 13 is a schematic block diagram of an encoder according to an embodiment.

FIG. 13 is a schematic block diagram of an encoder 40 for encoding a block of pixels in a video frame of a video sequence according to an embodiment.

A current block of pixels is predicted by performing a motion estimation by a motion estimator 50 from an already provided block of pixels in the same frame or in a previous frame. The result of the motion estimation is a motion or displacement vector associated with the reference block, in the case of inter prediction. The motion vector is utilized by a motion compensator 50 for outputting an inter prediction of the block of pixels.

An intra predictor 49 computes an intra prediction of the current block of pixels. The outputs from the motion estimator/compensator 50 and the intra predictor 49 are input in a selector 51 that either selects intra prediction or inter prediction for the current block of pixels. The output from the selector 51 is input to an error calculator in the form of an adder 41 that also receives the pixel values of the current block of pixels. The adder 41 calculates and outputs a residual error as the difference in pixel values between the block of pixels and its prediction.

The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block of pixels.

The transformed and quantized residual error for the current block of pixels is also provided to a inverse quantizer 45 and inverse transformer 46 to retrieve the original residual error. This error is added by an adder 47 to the block prediction output from the motion compensator 50 or the intra predictor 49 to create a reference block of pixels that can be used in the prediction and coding of a next block of pixels. This new reference block is first processed by a filtering control device 100 according to the embodiments in order to control any deblocking filtering that is applied to the reference block to combat any blocking artifact. The processed new reference block is then temporarily stored in a frame buffer 48, where it is available to the intra predictor 49 and the motion estimator/compensator 50.

Figure 14:
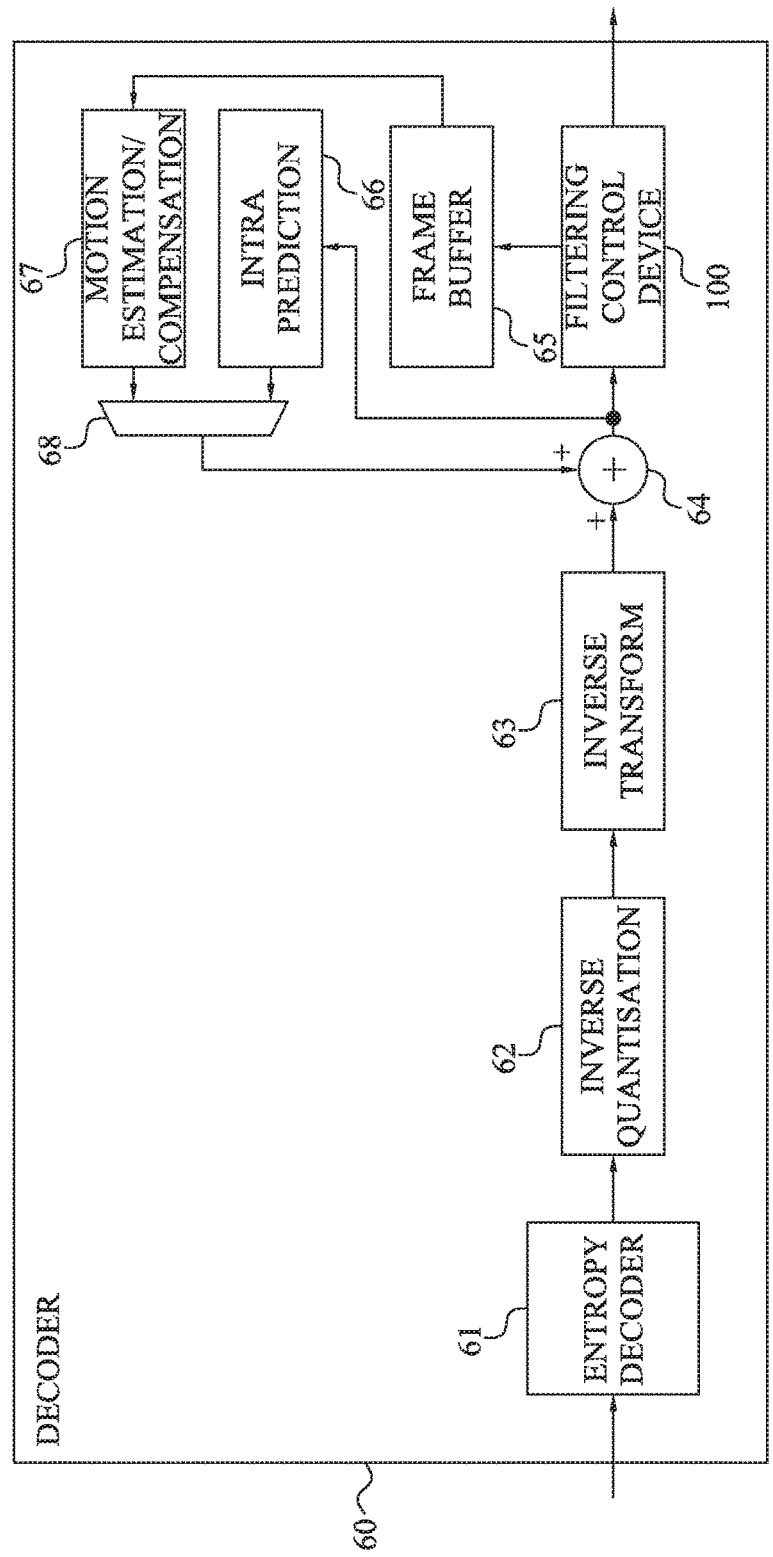
FIG. 14 is a schematic block diagram of a decoder according to an embodiment.
Figures 1, 2A, 2B:
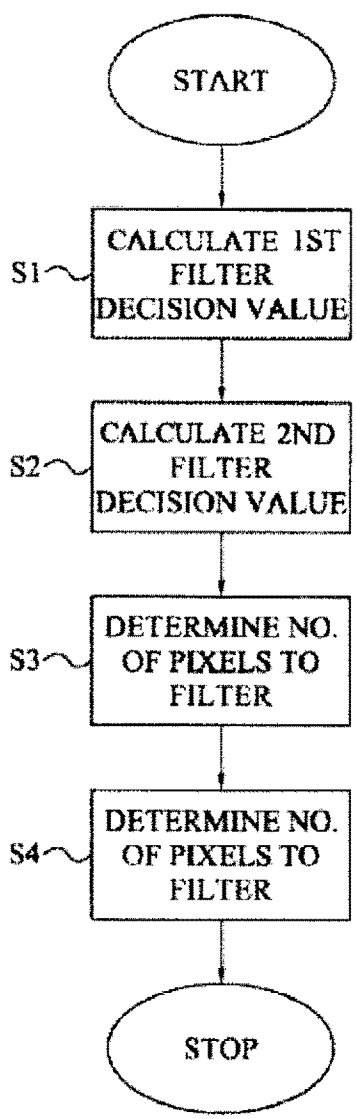

FIG. 14 is a corresponding schematic block diagram of a decoder 60 comprising a filtering control device 100 according to the embodiments. The decoder 60 comprises a decoder 61, such as entropy decoder, for decoding an encoded representation of a block of pixels to get a set of quantized and transformed residual errors. These residual errors are dequantized in an inverse quantizer 62 and inverse transformed by an inverse transformer 63 to get a set of residual errors.

These residual errors are added in an adder 64 to the pixel values of a reference block of pixels. The reference block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded block of pixels output form the adder 64 is input to a filtering control device 100 according to the embodiments in order to control any deblocking filter that is applied to combat any blocking artifacts. The filtered block of pixels is output form the decoder 60 and is furthermore preferably temporarily provided to a frame buffer 65 and can be used as a reference block of pixels for a subsequent block of pixels to be decoded. The frame buffer 65 is thereby connected to the motion estimator/compensator 67 to make the stored blocks of pixels available to the motion estimator/compensator 67.

The output from the adder 64 is preferably also input to the intra predictor 66 to be used as an unfiltered reference block of pixels.

In the embodiments disclosed in FIGS. 13 and 14 the filtering control device 100 controls deblocking filtering in the form of so called in-loop filtering. In an alternative implementation at the decoder 60 the filtering control device 100 is arranged to perform so called post-processing filtering. In such a case, the filtering control device 100 operates on the output frames outside of the loop formed by the adder 64, the frame buffer 65, the intra predictor 66, the motion estimator/compensator 67 and the selector 68. No deblocking filtering and filtering control is then typically done at the encoder.

FIG. 15 is a schematic block diagram of a user equipment or media terminal 80 housing a decoder 60 with a filtering control device. The user equipment 80 can be any device having media decoding functions that operates on an encoded video stream of encoded video frames to thereby decode the video frames and make the video data available. Non-limiting examples of such devices include mobile telephones and other portable media players, tablets, desktops, notebooks, personal video recorders, multimedia players, video streaming servers, set-top boxes, TVs, computers, decoders, game consoles, etc. The user equipment 80 comprises a memory 84 configured to store encoded video frames. These encoded video frames can have been generated by the user equipment 80 itself. Alternatively, the encoded video frames are generated by some other device and wirelessly transmitted or transmitted by wire to the user equipment 80. The user equipment 80 then comprises a transceiver (transmitter and receiver) or input and output port 82 to achieve the data transfer.

The encoded video frames are brought from the memory 84 to a decoder 60, such as the decoder illustrated in FIG. 14. The decoder 60 comprises a filtering control device 100 according to embodiments. The decoder 60 then decodes the encoded video frames into decoded video frames. The decoded video frames are provided to a media player 86 that is configured to render the decoded video frames into video data that is displayable on a display or screen 88 of or connected to the user equipment 80.

In FIG. 15, the user equipment 80 has been illustrated as comprising both the decoder 60 and the media player 86, with the decoder 60 implemented as a part of the media player 86. This should, however, merely be seen as an illustrative but non-limiting example of an implementation embodiment for the user equipment 80. Also distributed implementations are possible where the decoder 60 and the media player 86 are provided in two physically separated devices are possible and within the scope of user equipment 80 as used herein. The display 88 could also be provided as a separate device connected to the user equipment 80, where the actual data processing is taking place.

FIG. 16 illustrates another embodiment of a user equipment 80 that comprises en encoder, such as the encoder of FIG. 13, comprising a filtering control device according to the embodiments. The encoder 40 is then configured to encode video frames received by the I/O unit 82 and/or generated by the user equipment 80 itself. In the latter case, the user equipment 80 preferably comprises a media engine or recorder, such as in the form of or connected to a (video) camera. The user equipment 80 may optionally also comprise a media player 86, such as a media player 86 with a decoder and filtering control device according to the embodiments, and a display 88.

As illustrated in FIG. 17, the encoder 40 and/or decoder 60, such as illustrated in FIGS. 13 and 14, may be implemented in a network device 30 being or belonging to a network node in a communication network 32 between a sending unit 34 and a receiving user equipment 36. Such a network device 30 may be a device for converting video according to one video coding standard to another video coding standard, for example, if it has been established that the receiving user equipment 36 is only capable of or prefers another video coding standard than the one sent from the sending unit 34. The network device 30 can be in the form of or comprised in a radio base station, a Node-B or any other network node in a communication network 32, such as a radio-based network.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

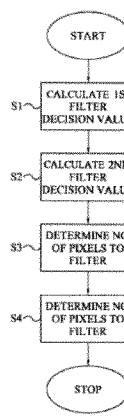

What is claimed:

1. A method for filtering control applicable to a block of multiple pixels in a video frame, each pixel having a respective pixel value, said method comprising:

calculating a first filter decision value for said block, by only using pixels $p2_i$, $p1_i$ and $p0_i$, based on:

$$|p2_i - 2p1_i + p0_i|$$

wherein $p0_i$ denotes a pixel value of a pixel closest to, in a first line of pixels in said block, a block boundary to a neighboring block of multiple pixels in said video frame, $p1_i$ denotes a pixel value of a pixel next closest to, in said first line of pixels, said block boundary and $p2_i$ denotes a pixel value of a pixel second next closest to, in said first line of pixels, said block boundary;

calculating a second filter decision value for said neighboring block, by only using pixels $q2_i$, $q1_i$ and $q0_i$, based on:

$$|q2_i - 2q1_i + q0_i|$$

wherein $q0_i$ denotes a pixel value of a pixel in said neighboring block closest to, in a corresponding first line of pixels in said neighboring block, said block boundary, $q1_i$ denotes a pixel value of a pixel of said neighboring block next closest to, in said corresponding first line of pixels, said block boundary and $q2_i$ denotes a pixel value of a pixel in said neighboring block second next closest to, in said corresponding first line of pixels, said block boundary;

determining how many pixels in said first line of pixels in said block to filter relative to said block boundary based on a comparison of said first filter decision value to a first threshold value; and determining how many pixels in said corresponding first line of pixels in said neighboring block to filter relative to said block boundary based on a comparison of said second filter decision value to a second threshold value;

wherein:

calculating said first filter decision value comprises calculating said first filter decision value as:

$$|p2_0-2p1_0+p0_0|+|p2_3-2p1_3+p0_3|$$

wherein $p0_0$ denotes said pixel value of said pixel closest to, in said first line of pixels, said block boundary, $p1_0$ denotes said pixel value of said pixel next closest to, in said first line of pixels, said block boundary, $p2_0$ denotes said pixel value of said pixel second next closest to, in said first line of pixels, said block boundary, $p0_3$ denotes a pixel value of a pixel closest to, in a second line of pixels in said block, said block boundary, $p1_3$ denotes a pixel value of a pixel next closest to, in said second line of pixels, said block boundary and $p2_3$ denotes a pixel value of a pixel second next closest to, in said second line of pixels, said block boundary; and calculating said second filter decision value comprises calculating said second filter decision value as:

$$|q2_0-2q1_0+q0_0|+|q2_3-2q1_3+q0_3|$$

wherein $q0_0$ denotes said pixel value of said pixel in said neighboring block closest to, in said corresponding first line of pixels, said block boundary, $q1_0$ denotes said pixel value of said pixel of said neighboring block next closest to, in said corresponding first line of pixels, said block boundary, $q2_0$ denotes said pixel value of said pixel in said neighboring block second next closest to, in said corresponding first line of pixels, said block boundary, $q0_3$ denotes a pixel value of a pixel in said neighboring block closest to, in a corresponding second line of pixels in said neighboring block, said block boundary, $q1_3$ denotes a pixel value of a pixel of said neighboring block next closest to, in said corresponding second line of pixels, said block boundary and $q2_3$ denotes a pixel value of a pixel in said neighboring block second next closest to, in said corresponding second line of pixels, said block boundary; and wherein:

determining how many pixels in said first line of pixels in said block to filter comprises:

comparing said first filter decision value to a first threshold value;

determining to filter two pixels in said first line of pixels in said block relative to said block boundary if said first filter decision value is below said first threshold value; and determining to filter one pixel in said first line of pixels in said block relative to said block boundary if said first filter decision value is equal to or exceeds said first threshold value; and determining how many pixels in said corresponding first line of pixels in said neighboring block to filter comprises:

comparing said second filter decision value to a second threshold value;

determining to filter two pixels in said corresponding first line of pixels in said neighboring block relative to said block boundary if said second filter decision value is below said second threshold value; and determining to filter one pixel in said corresponding first line of pixels in said neighboring block relative to said block boundary if said second filter decision value is equal to or exceeds said second threshold value.

2. A method for filtering control applicable to a block of multiple pixels in a video frame, each pixel having a respective pixel value, said method comprising:

calculating a first filter decision value for said block, by only using pixels $p2_i$, $p1_i$ and $p0_i$, based on:

$$|p2_i-2p1_i+p0_i|$$

wherein $p0_i$ denotes a pixel value of a pixel closest to, in a first line of pixels in said block, a block boundary to a neighboring block of multiple pixels in said video frame, $p1_i$ denotes a pixel value of a pixel next closest to, in said first line of pixels, said block boundary and $p2_i$ denotes a pixel value of a pixel second next closest to, in said first line of pixels, said block boundary;

calculating a second filter decision value for said neighboring block, by only using pixels $q2_i$, $q1_i$ and $q0_i$, based on:

$$|q2_i-2q1_i+q0_i|$$

wherein $q0_i$ denotes a pixel value of a pixel in said neighboring block closest to, in a corresponding first line of pixels in said neighboring block, said block boundary, $q1_i$ denotes a pixel value of a pixel of said neighboring block next closest to, in said corresponding first line of pixels, said block boundary and $q2_i$ denotes a pixel value of a pixel in said neighboring block second next closest to, in said corresponding first line of pixels, said block boundary;

determining how many pixels in said first line of pixels in said block to filter relative to said block boundary based on a comparison of said first filter decision value to a first threshold value; and determining how many pixels in said corresponding first line of pixels in said neighboring block to filter relative to said block boundary based on a comparison of said second filter decision value to a second threshold value;

wherein:

calculating said first filter decision value comprises calculating said first filter decision value as:

$$|p2_0-2p1_0+p0_0|+|p2_3-2p1_3+p0_3|$$

wherein $p0_0$ denotes said pixel value of said pixel closest to, in said first line of pixels, said block boundary, $p1_0$ denotes said pixel value of said pixel next closest to, in said first line of pixels, said block boundary, $p2_0$ denotes said pixel value of said pixel second next closest to, in said first line of pixels, said block boundary, $p0_3$ denotes a pixel value of a pixel closest to, in a second line of pixels in said block, said block boundary, $p1_3$ denotes a pixel value of a pixel next closest to, in said second line of pixels, said block boundary and $p2_3$ denotes a pixel value of a pixel second next closest to, in said second line of pixels, said block boundary; and calculating said second filter decision value comprises calculating said second filter decision value as:

$$|q2_0-2q1_0+q0_0|+|q2_3-2q1_3+q0_3|$$

wherein $q0_0$ denotes said pixel value of said pixel in said neighboring block closest to, in said corresponding first line of pixels, said block boundary, $q1_0$ denotes said pixel value of said pixel of said neighboring block next closest to, in said corresponding first line of pixels, said block boundary, $q2_0$ denotes said pixel value of said pixel in said neighboring block second next closest to, in said corresponding first line of pixels, said block boundary, $q0_3$ denotes a pixel value of a pixel in said neighboring block closest to, in a corresponding second line of pixels in said neighboring block, said block boundary, $q1_3$ denotes a pixel value of a pixel of said neighboring block next closest to, in said corresponding second line of pixels, said block boundary and $q2_3$ denotes a pixel value of a pixel in said neighboring block second next closest to, in said corresponding second line of pixels, said block boundary; and wherein:
  determining how many pixels in said first line of pixels in said block to filter comprises:
    comparing said first filter decision value to a first threshold value;
    determining to filter two pixels in said first line of pixels in said block relative to said block boundary if said first filter decision value is below said first threshold value; and
    determining to filter no pixels in said first line of pixels in said block relative to said block boundary if said first filter decision value is equal to or exceeds said first threshold value; and
  determining how many pixels in said corresponding first line of pixels in said neighboring block to filter comprises:
    comparing said second filter decision value to a second threshold value;
    determining to filter two pixels in said corresponding first line of pixels in said neighboring block relative to said block boundary if said second filter decision value is below said second threshold value; and
    determining to filter no pixels in said corresponding first line of pixels in said neighboring block relative to said block boundary if said second filter decision value is equal to or exceeds said second threshold value.

3. A filtering control device comprising:
a processing circuit configured to:
  calculate a first filter decision value for a block of multiple pixels in a video frame, by only using pixels $p2_i$, $p1_i$ and $p0_i$, based on:

$$|p2_i-2p1_i+p0_i|$$

wherein $p0_i$ denotes a pixel value of a pixel closest to, in a first line of pixels in said block, a block boundary to a neighboring block of multiple pixels in said video frame, $p1_i$ denotes a pixel value of a pixel next closest to, in said first line of pixels, said block boundary and $p2_i$ denotes a pixel value of a pixel second next closest to, in said first line of pixels, said block boundary;
  calculate a second filter decision value for a neighboring block, by only using pixels $q2_i$, $q1_i$ and $q0_i$, based on:

$$|q2_i-2q1_i+q0_i|$$

wherein $q0_i$ denotes a pixel value of a pixel in said neighboring block closest to, in a corresponding first line of pixels in said neighboring block, said block boundary, $q1_i$ denotes a pixel value of a pixel of said neighboring block next closest to, in said corresponding first line of pixels, said block boundary and $q2_i$ denotes a pixel value of a pixel in said neighboring block second next closest to, in said corresponding first line of pixels, said block boundary;
  determine how many pixels in a first line of pixels in said block to filter relative to said block boundary based on said first filter decision value calculated by said first decision value calculator; and
  determine how many pixels in a corresponding first line of pixels in said neighboring block to filter relative to said block boundary based on said second filter decision value calculated by said second decision value calculator, wherein
  compare said first filter decision value calculated by said first decision value calculator to a first threshold value; and
  compare said second filter decision value calculated by said second decision value calculator to a second threshold value;
wherein the processing circuit is configured to:
  calculate said first filter decision value as:

$$|p2_0-2p1_0+p0_0|+|p2_3-2p1_3+p0_3|$$

wherein $p0_0$ denotes said pixel value of said pixel closest to, in said first line of pixels, said block boundary, $p1_0$ denotes said pixel value of said pixel next closest to, in said first line of pixels, said block boundary, $p2_0$ denotes said pixel value of said pixel second next closest to, in said first line of pixels, said block boundary, $p0_3$ denotes a pixel value of a pixel closest to, in a second line of pixels in said block, said block boundary, $p1_3$ denotes a pixel value of a pixel next closest to, in said second line of pixels, said block boundary and $p2_3$ denotes a pixel value of a pixel second next closest to, in said second line of pixels, said block boundary; and
  calculate said second filter decision value as:

$$|q2_0-2q1_0+q0_0|+|q2_3-2q1_3+q0_3|$$

wherein $q0_0$ denotes said pixel value of said pixel in said neighboring block closest to, in said corresponding first line of pixels, said block boundary, $q1_0$ denotes said pixel value of said pixel of said neighboring block next closest to, in said corresponding first line of pixels, said block boundary, $q2_0$ denotes said pixel value of said pixel in said neighboring block second next closest to, in said corresponding first line of pixels, said block boundary, $q0_3$ denotes a pixel value of a pixel in said neighboring block closest to, in a corresponding second line of pixels in said neighboring block, said block boundary, $q1_3$ denotes a pixel value of a pixel of said neighboring block next closest to, in said corresponding second line of pixels, said block boundary and $q2_i$ denotes a pixel value of a pixel in said neighboring block second next closest to, in said corresponding second line of pixels, said block boundary.

4. The filtering control device of claim 3, wherein the processing circuit is configured to:
  i) determine to filter two pixels in said first line of pixels in said block relative to said block boundary if said first filter decision value is below said first threshold value as determined by said first comparator and ii) determine to filter one pixel in said first line of pixels in said block relative to said block boundary if said first filter decision value is equal to or exceeds said first threshold value as determined by said first comparator; and i) determine to filter two pixels in said corresponding first line of pixels in said neighboring block relative to said block boundary if said second filter decision value is below said second threshold value as determined by said second comparator and ii) determine to filter one pixel in said corresponding first line of pixels in said neighboring block relative to said block boundary if said second filter decision value is equal to or exceeds said second threshold value as determined by said second comparator.

5. The filtering control device of claim 3, wherein the processing circuit is configured to:

compare said first filter decision value to a first threshold value; and compare said second filter decision value to a second threshold value, wherein i) determine to filter two pixels in said first line of pixels in said block relative to said block boundary if said first filter decision value is below said first threshold value as determined by said first comparator and ii) determine to filter no pixels in said first line of pixels in said block relative to said block boundary if said first filter decision value is equal to or exceeds said first threshold value as determined by said first comparator; and i) determine to filter two pixels in said corresponding first line of pixels in said neighboring block relative to said block boundary if said second filter decision value is below said second threshold value as determined by said second comparator and ii) determine to filter no pixels in said corresponding first line of pixels in said neighboring block relative to said block boundary if said second filter decision value is equal to or exceeds said second threshold value as determined by said second comparator.

6. The filtering control device of claim 3, wherein the processing circuit is configured to i) determine said first threshold value based on a quantization parameter associated with said block, and ii) determine said second threshold value based on a quantization parameter associated with said neighboring block.

7. The filtering control device of claim 3, wherein the processing circuit is configured to:

calculate a first offset Δ based $$\frac{9 \times (q0_j - p0_j) - 3 \times (q1_j - p1_j)}{16},$$

wherein $p0_j$ denotes a pixel value of a pixel closest to, in said first line of pixels, said block boundary, $p1_j$ denotes a pixel value of a pixel next closest to, in said first line of pixels, said block boundary, $q0_j$ denotes a pixel value of a pixel in said neighboring block closest to, in said corresponding first line of pixels, said block boundary and $q1_j$ denotes a pixel value of a pixel of said neighboring block next closest to, in said corresponding first line of pixels, said block boundary;

modify said pixel value of said pixel closest to said block boundary in said first line of pixels by adding said first offset calculated by said first offset calculator to said pixel value of said pixel closest to said block boundary in said first line of pixels;

modify said pixel value of said pixel in said neighboring block closest to said block boundary in said corresponding first line of pixels by subtracting said first offset calculated by said first offset calculator from said pixel value of said pixel in said neighboring block closest to said block boundary in said corresponding first line of pixels;

calculate, if said first filter decision value is below said first threshold value, a second offset based on $$\frac{p0_j + p2_j - 2p1_j + 2\Delta}{4},$$

wherein $p2_j$ denotes a pixel value of a pixel second next closest to, in said first line of pixels, said block boundary;

modify, if said first filter decision value is below said first threshold, said pixel value of said pixel next closest to said block boundary in said first line of pixels by adding said second offset calculated by said second offset calculator to said pixel value of said pixel next closest to said block boundary in said first line of pixels;

calculate, if said second filter decision value is below said second threshold value, a third offset based on $$\frac{q0_j + q2_j - 2q1_j - 2\Delta}{4},$$

wherein $q2_j$ denotes a pixel value of a pixel in said neighboring block second next closest to, in said corresponding first line of pixels, said block boundary; and modify, if said second filter decision value is below said second threshold, said pixel value of said pixel in said neighboring block next closest to said block boundary in said corresponding first line of pixels by adding said third offset to said pixel value of said pixel in said neighboring block next closest to said block boundary in said corresponding first line of pixels.

8. The filtering control device of claim 3, wherein the processing circuit is configured to:

compare a sum of said first filter decision value and said second filter decision value to a threshold value, wherein determine, if said sum of said first filter decision value and said second filter decision value is below said threshold value, how many pixels in said first line of pixels in said block to filter relative to said block boundary based on said first filter decision value; and determine, if said sum of said first filter decision value and said second filter decision value is below said threshold value, how many pixels in said corresponding first line of pixels in said neighboring block to filter relative to said block boundary based on said second filter decision value.

9. An encoder comprising the filtering control device of claim 3.

10. A user equipment comprising:

a memory configured to store video frames; and the encoder of claim 9 configured to encode said video frames into encoded video frames, wherein said memory is further configured to store said encoded video frames.

11. A decoder comprising the filtering control device of claim 3.

12. A user equipment comprising:
   a memory configured to store encoded video frames;
   the decoder of claim 11 configured to decode said encoded video frames into decoded video frames; and
   a media player configured to render said decoded video frames into video data displayable on a display.

13. A non-transitory computer-readable medium comprising, stored thereupon, a computer program for filtering control of a block of multiple pixels in a video frame, each pixel having a respective pixel value, said computer program comprising program code that when run on a computer causes the computer to:
   calculate a first filter decision value for said block, by only using pixels $p2_i$, $p1_i$, and $p0_i$, based on:

$$|p2_i-2p1_i+p0_i|$$

wherein $p0_i$ denotes a pixel value of a pixel closest to, in a first line of pixels in said block, a block boundary to a neighboring block of multiple pixels in said video frame, $p1_i$ denotes a pixel value of a pixel next closest to, in said first line of pixels, said block boundary and $p2_i$ denotes a pixel value of a pixel second next closest to, in said first line of pixels, said block boundary;
   calculate a second filter decision value for said neighboring block, by only using pixels $q2_i$, $q1_i$ and $q0_i$, based on:

$$|q2_i-2q1_i+q0_i|$$

wherein $q0_i$ denotes a pixel value of a pixel in said neighboring block closest to, in a corresponding first line of pixels in said neighboring block, said block boundary, $q1_i$ denotes a pixel value of a pixel of said neighboring block next closest to, in said corresponding first line of pixels, said block boundary and $q2_i$ denotes a pixel value of a pixel in said neighboring block second next closest to, in said corresponding first line of pixels, said block boundary;
   determine how many pixels in a first line of pixels in said block to filer relative to said block boundary based on said first filter decision value; and
   determine how many pixels in a corresponding first line of pixels in said neighboring block to filter relative to said block boundary based on said second filter decision value,
   wherein determining how many pixels in said first line of pixels in said block to filter comprises determining how many pixels in said first line of pixels in said block to filter relative to said block boundary based on a comparison of said first filter decision value to a first threshold value; and
   determining how many pixels in said corresponding first line of pixels in said neighboring block to filter comprises determining how many pixels in said corresponding first line of pixels in said neighboring block to filter relative to said block boundary based on a comparison of said second filter decision value to a second threshold value; and
   wherein the program code is further configured to cause the computer to:
   calculate said first filter decision value as:

$$|p2_0-2p1_0+p0_0|+|p2_3-2p1_3+p0_3|$$

wherein $p0_0$ denotes said pixel value of said pixel closest to, in said first line of pixels, said block boundary, $p1_0$ denotes said pixel value of said pixel next closest to, in said first line of pixels, said block boundary, $p2_0$ denotes said pixel value of said pixel second next closest to, in said first line of pixels, said block boundary, $p0_3$ denotes a pixel value of a pixel closest to, in a second line of pixels in said block, said block boundary, $p1_3$ denotes a pixel value of a pixel next closest to, in said second line of pixels, said block boundary and $p2_3$ denotes a pixel value of a pixel second next closest to, in said second line of pixels, said block boundary; and
   calculate said second filter decision value as:

$$|q2_0-2q1_0+q0_1|+|q2_3-2q1_3+q0_3|$$

wherein $q0_0$ denotes said pixel value of said pixel in said neighboring block closest to, in said corresponding first line of pixels, said block boundary, $q1_0$ denotes said pixel value of said pixel of said neighboring block next closest to, in said corresponding first line of pixels, said block boundary, $q2_0$ denotes said pixel value of said pixel in said neighboring block second next closest to, in said corresponding first line of pixels, said block boundary, $q0_3$ denotes a pixel value of a pixel in said neighboring block closest to, in a corresponding second line of pixels in said neighboring block, said block boundary, $q1_3$ denotes a pixel value of a pixel of said neighboring block next closest to, in said corresponding second line of pixels, said block boundary and $q2_3$ denotes a pixel value of a pixel in said neighboring block second next closest to, in said corresponding second line of pixels, said block boundary.

* * * * *

UNITED STATES PATENT AND TRADEMARK OFFICE
CERTIFICATE OF CORRECTION

PATENT NO. : 9,955,188 B2
APPLICATION NO. : 15/476656
DATED : April 24, 2018
INVENTOR(S) : Norkin et al.

It is certified that error appears in the above-identified patent and that said Letters Patent is hereby corrected as shown below:

Replace Title Page with attached Title Page.

Replace Drawing Sheet 1 of 11 with attached Drawing Sheet 1 of 11.

In Column 1, Line 42, delete "a, b c" and insert -- a, b, c --, therefor.

In Column 2, Line 14, delete "of" and insert -- of: --, therefor.

In Column 4, Lines 19-29, delete "Yet another aspect defines a user equipment comprising a memory configured to store video frames and an encoder with a filtering control device as defined above to encode the video frames into encoded video frames, which are stored in the memory. A further aspect defines a user equipment comprising a memory configured to store encoded video frames and a decoder with a filtering control device as defined above to decode the encoded video frames into decoded video frames. A media player of the user equipment is configured to render the decoded video frames into video data displayable on a display." and insert the same at Line 18 after "above." as a continuation paragraph.

In Column 7, Line 1, delete "frame." and insert -- frame, --, therefor.

In Column 7, Lines 33-34, delete "first line 10" and insert -- first line 12 --, therefor.

In Column 7, Line 35, delete "first line 20" and insert -- first line 22 --, therefor.

In Column 9, Line 38, delete "boundary." and insert -- boundary; --, therefor.

In Column 13, Line 21, delete "boundary 20" and insert -- boundary 1 --, therefor.

In Column 13, Line 42, delete "2B" and insert -- 2B, --, therefor.

Signed and Sealed this
Nineteenth Day of February, 2019

Andrei Iancu
*Director of the United States Patent and Trademark Office*

CERTIFICATE OF CORRECTION (continued)
U.S. Pat. No. 9,955,188 B2

In Column 13, Line 53, delete "FIG. 3" and insert -- FIG. 1 --, therefor.

In Column 16, Line 13, delete "parameter 3" and insert -- parameter β --, therefor.

In Column 16, Line 46, delete "15, 1)," and insert -- 15, 17, --, therefor.

In Column 19, Line 27, delete "at lot" and insert -- a lot --, therefor.

In Column 20, Line 47, delete "a the" and insert -- the --, therefor.

In Column 23, Line 25, delete "alterative" and insert -- alternative --, therefor.

In Column 23, Line 54, delete "pixel" and insert -- decision --, therefor.

In Column 24, Line 49, delete "a inverse" and insert -- an inverse --, therefor.

In Column 25, Line 11, delete "form the" and insert -- from the --, therefor.

In Column 25, Line 14, delete "form the" and insert -- from the --, therefor.

In Column 26, Lines 9, delete "en encoder," and insert -- an encoder, --, therefor.

In Column 30, Line 58, in Claim 3, delete "$q2_i$" and insert -- $q2_3$ --, therefor.

In Column 31, Line 48, in Claim 7, delete "based" and insert -- based on --, therefor.

In Column 33, Line 14, in Claim 13, delete "$p1_i$," and insert -- $p1_i$ --, therefor.

(12) United States Patent
Norkin et al.

(10) Patent No.: US 9,955,188 B2
(45) Date of Patent: Apr. 24, 2018

(54) DEBLOCKING FILTERING CONTROL

(71) Applicant: Telefonaktiebolaget LM Ericsson (publ), Stockholm (SE)

(72) Inventors: Andrey Norkin, Solna (SE); Kenneth Andersson, Gävle (SE); Rickard Sjöberg, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/476,656

(22) Filed: Mar. 31, 2017

(65) Prior Publication Data
US 2017/0272781 A1    Sep. 21, 2017

Related U.S. Application Data

(63) Continuation of application No. 14/001,627, filed as application No. PCT/SE2011/051526 on Dec. 16, 2011, now Pat. No. 9,641,841.
(Continued)

(51) Int. Cl.
*H04N 19/117* (2014.01)
*H04N 19/86* (2014.01)
(Continued)

(52) U.S. Cl.
CPC ......... *H04N 19/86* (2014.11); *H04N 19/117* (2014.11); *H04N 19/14* (2014.11); *H04N 19/176* (2014.11); *H04N 19/82* (2014.11)

(58) Field of Classification Search
None
See application file for complete search history.

(56) References Cited

U.S. PATENT DOCUMENTS

| | | | |
|---|---|---|---|
| 2004/0101059 A1* | 5/2004 | Joch | H04N 19/159 375/240.29 |
| 2005/0013363 A1* | 1/2005 | Cho | H04N 19/105 375/240.12 |

(Continued)

FOREIGN PATENT DOCUMENTS

| | | |
|---|---|---|
| EP | 2681913 B1 | 11/2015 |
| JP | 2005123732 A | 5/2005 |

(Continued)

OTHER PUBLICATIONS

An, Jicheng et al., "CE 8 subtest1: Improved deblocking filter", IEEE, Joint Collaborative Team on Video Coding (JCT-VC) of ITU-T SG16 WP3 and ISO/IEC JTC1/SC29/WG11, 4th Meeting: Daegu, Korea, Jan. 2011, 1-8.

(Continued)

*Primary Examiner* — William C Vaughn, Jr.
*Assistant Examiner* — Michael J Hess
(74) *Attorney, Agent, or Firm* — Murphy, Bilak & Homiller, PLLC

(57) ABSTRACT

A first filter decision value is calculated for a block of pixels in a video frame based on pixel values of pixels in a first line of pixels in the block. A second filter decision value is also calculated for the block based on pixel values of pixels in a corresponding first line of pixels in a neighboring block in the video frame. The first filter decision value is used to determine how many pixels in a line of pixels in the block to filter relative to a block boundary between the block and the neighboring block. The second filter decision value is used to determine how many pixels in a corresponding line of pixels in the neighboring block to filter relative to the block boundary.

13 Claims, 11 Drawing Sheets